(12) United States Patent
Moffat

(10) Patent No.: US 8,925,313 B2
(45) Date of Patent: Jan. 6, 2015

(54) WAVE ENERGY CONVERSION APPARATUS

(76) Inventor: Brian Lee Moffat, Simi Valley, CA (US)

( * ) Notice: Subject to any disclaimer, the term of this patent is extended or adjusted under 35 U.S.C. 154(b) by 798 days.

(21) Appl. No.: 12/389,928

(22) Filed: Feb. 20, 2009

(65) Prior Publication Data

US 2009/0211241 A1 Aug. 27, 2009

Related U.S. Application Data

(60) Provisional application No. 61/066,702, filed on Feb. 22, 2008.

(51) Int. Cl.
*F03B 13/18* (2006.01)
*F03B 13/22* (2006.01)

(52) U.S. Cl.
CPC ........... *F03B 13/22* (2013.01); *F05B 2240/242* (2013.01); *F05B 2250/25* (2013.01); *Y02E 10/38* (2013.01)
USPC .................................. 60/502; 60/497; 60/501

(58) Field of Classification Search
USPC .................... 60/495–507; 290/1 R, 42, 43, 53
See application file for complete search history.

(56) References Cited

U.S. PATENT DOCUMENTS

| | | | |
|---|---|---|---|
| 1,502,511 A | | 7/1924 | Marvin |
| 3,064,137 A | | 11/1962 | Corbett et al. |
| 3,619,632 A | * | 11/1971 | Labombarde ................... 290/43 |
| 3,870,893 A | * | 3/1975 | Mattera ........................... 290/53 |
| 3,912,938 A | | 10/1975 | Filipenco |
| 4,163,904 A | * | 8/1979 | Skendrovic ..................... 290/54 |
| 4,221,538 A | | 9/1980 | Wells |
| 4,313,711 A | * | 2/1982 | Lee .................................. 415/7 |
| 4,359,868 A | | 11/1982 | Slonim |
| 4,447,740 A | * | 5/1984 | Heck ............................... 290/53 |
| 4,462,211 A | * | 7/1984 | Linderfelt ....................... 60/501 |
| 4,545,726 A | | 10/1985 | Holliger |
| 4,631,921 A | * | 12/1986 | Linderfelt ....................... 60/501 |

(Continued)

FOREIGN PATENT DOCUMENTS

| | | |
|---|---|---|
| GB | 745084 | 7/1954 |
| GB | 1447758 | 9/1976 |

(Continued)

OTHER PUBLICATIONS

U.S. Appl. No. 12/777,409, Office Action dated Jun. 5, 2013 including Appendix 1, Appendix 2, and Appendix 3.

(Continued)

*Primary Examiner* — Christopher Jetton
(74) *Attorney, Agent, or Firm* — Brooks Acordia IP Law, PC; Douglas N. Larson

(57) ABSTRACT

A device that converts wave energy to electrical or chemical energy includes a buoy adapted to float on a water surface, a venturi tube, and a rigid or flexible means of connecting the buoy and the venturi tube. The venturi tube defines a lumen through which water flows downwardly when the buoy moves upwardly and upwardly when the buoy moves downwardly. A constriction is formed in the lumen to create a venturi effect for water flowing upwardly and downwardly through the lumen. A turbine is positioned in the lumen at the constriction where water flow is at a maximum rate. The turbine is connected to a generator so that the venturi effect is harnessed to generate power. Multiple embodiments are included.

71 Claims, 22 Drawing Sheets

(56) References Cited

U.S. PATENT DOCUMENTS

| | | | | |
|---|---|---|---|---|
| 5,136,173 A * | 8/1992 | Rynne | ............... | 290/53 |
| 5,770,893 A * | 6/1998 | Youlton | ............... | 290/53 |
| 6,140,712 A * | 10/2000 | Fredriksson et al. | ............... | 290/53 |
| 6,216,455 B1 * | 4/2001 | Doleh et al. | ............... | 60/398 |
| 6,226,989 B1 * | 5/2001 | Fredriksson et al. | ............... | 60/501 |
| 6,291,904 B1 * | 9/2001 | Carroll | ............... | 290/53 |
| 6,756,695 B2 | 6/2004 | Hibbs et al. | | |
| 6,768,216 B1 * | 7/2004 | Carroll et al. | ............... | 290/42 |
| 6,772,592 B2 | 8/2004 | Gerber et al. | | |
| 6,933,623 B2 * | 8/2005 | Carroll et al. | ............... | 290/42 |
| 2005/0001432 A1 * | 1/2005 | Susman et al. | ............... | 290/43 |
| 2005/0285407 A1 | 12/2005 | Davis et al. | | |
| 2009/0179425 A1 * | 7/2009 | Van Drentham Susman et al. | ............... | 290/53 |

FOREIGN PATENT DOCUMENTS

| | | | |
|---|---|---|---|
| JP | 51-86639 | | 7/1976 |
| JP | 55104575 A | * | 8/1980 |
| JP | 57-70959 | | 5/1982 |
| JP | 57-070959 | | 5/1982 |
| JP | 57070959 A | * | 5/1982 |
| JP | 58-104371 | | 6/1983 |
| JP | 53-134133 | | 1/1985 |
| JP | 61-261677 | | 11/1986 |
| JP | 2002-310054 | | 10/2002 |
| JP | 2005-502821 | | 1/2005 |
| JP | 2005-504227 | | 2/2005 |

OTHER PUBLICATIONS

U.S. Appl. No. 12/777,409, Office Action dated Sep. 14, 2012.
U.S. Appl. No. 12/777,409, Amendment, Mar. 14, 2013.
U.S. Appl. No. 12/777,409, Amendment, Jun. 4, 2012.
Notification of Reasons for Refusal for Japanese Patent Application No. 2012-501981, Drafted Jul. 30, 2013, dispatched Aug. 5, 2013, English translation.
Japanese Office action for patent application No. 2012-501981, dispatched Jul. 8, 2014.
English translation of Japanese Office action for patent application No. 2012-501981, dispatched Jul. 8, 2014.

* cited by examiner

WAVE ENERGY CONVERSION APPARATUS

CROSS-REFERENCE TO RELATED APPLICATIONS

This application is a non-provisional of provisional patent application filed by the same inventor on Feb. 22, 2008, entitled "'Venturi,' 'Chambered Venturi' and 'Sea-Anchor' Wave Energy Conversion Systems.'"

BACKGROUND OF THE INVENTION

1. Field of the Invention

This invention relates, generally, to wave energy conversion devices that convert abundant natural energy present in oceans and other bodies of water into electrical or chemical energy such as the creation of hydrogen from water through electrolysis.

2. Description of the Prior Art

Water turbines have been used to extract useful energy from moving water, or water under pressure, for thousands of years. Many different types of water turbines have been invented and used in the past to extract energy from water under a variety of circumstances, and characterized by a variety of characteristics, with optimal efficiencies. e.g., Francis turbines, Pelton turbines, Kaplan turbines, etc.

The design of water turbines is a mature discipline. Most modern turbines convert the kinetic or potential energy of water into rotary motion which can be used to create electricity with efficiencies that exceed 90%. It is relatively easy to find an existing water turbine design that will optimally harvest the kinetic or potential energy available in almost any river or dam.

However, attempts to extract energy from waves moving across the surface of an ocean or sea are relatively new. Some designs have been proposed in the literature, and described in prior patents. Most are constrained to use in relatively shallow ocean waters where they may be anchored in some manner to the ocean floor. Very few are capable of operating in the deepest parts of the ocean, without benefit of a direct connection to the ocean floor.

Over the years, many devices designed to convert the kinetic and potential energy of ocean waves into electricity, or some other usable form of energy, have been built, patented and proposed. There are many good reasons to engage in such research and development efforts. Ocean waves represent a renewable energy source whose harvesting would not degrade the environment and ecology of the earth. Ocean waves also represent a very concentrated energy source, offering the potential for the harvesting of large amounts of energy from relatively small devices.

There are many potential benefits to developing and using such devices. Replacing the burning of fossil fuels with renewable sources of energy will reduce levels of $CO_2$ entering the atmosphere, and it will reduce the levels of other pollutants in the air such as various sulfur compounds, nitrogen compounds, particulates, etc. Fossil fuels will eventually be exhausted but renewable sources of energy will never be exhausted.

Waves traversing the surface of the ocean represent a repository of a large fraction of the total energy imparted to the earth by the sun. The sun heats the land and the seas and much of this heat energy passes into the atmosphere. Differential heating of the atmosphere across the surface of the earth, in conjunction with the rotation of the earth, causes the atmosphere to move across the surface of the Earth, sometimes at relatively high speeds.

When the atmosphere moves over the surface of the earth's lakes and oceans, it imparts some of its kinetic energy to the waters at the surface of those lakes and oceans, thereby creating waves on the surfaces of said bodies of water. The amplitude of those waves increases as long as the wind blows parallel to the directions in which the waves are propagating. The uninterrupted distance over which the wind blows in a direction parallel to a wave's propagation, imparting increasing amounts of energy to that wave, is called the "fetch" of the wave.

Typical ocean wind waves range from three-tenths of a meter (0.3 m) to five meters (5.0 m) in height. At higher latitudes, ten meter (10.0 m) waves are not uncommon.

The prior art includes a type of wave-energy device capable of operating without an anchor. It includes a unidirectional or bi-directional propeller suspended from a buoy by a shaft or cable. As the buoy moves up and down in response to passing waves, the propeller is moved up and down through the relatively still waters below the surface. This motion of the propeller through relatively still waters compels the propeller to spin. The propeller spins in a constant direction if the propeller is bi-directional but its direction of rotation reverses if the propeller is unidirectional. Such a device does not generate much power.

Even though the force driving the water back and forth through a suspended turbine would be great, the speed of the water's movement is relatively slow. When driven by waves with a height of 5 meters and a period of 8 seconds, the maximum speed of a suspended turbine relative to the water would be two meters per second (2 m/s). At this speed, it would be difficult to extract a significant amount of energy from the flowing water with a simple turbine because the amount of power that can be extracted from a flowing stream of water by a turbine is proportional to the cube of its velocity. In other words, $$Power = k A v^3$$

Where "k" is a constant dependent upon the efficiency of a particular turbine's design and implementation, "A" is the cross-sectional area of the stream of water from which power is extracted, and "v" is the velocity of the water.

Since ocean waves rise and fall with a relatively slow speed (the maximum of which is generally only one or two meters per second), it is difficult to extract much energy from the water constrained to flow through a propeller.

However, if the speed of the water constrained to flow through a propeller could be increased, then the power that could be extracted could be increased exponentially. For example, if the speed of the water flowing through the propeller could be increased from a maximum of two (2) to eight (8) meters per second (i.e., a four-fold increase in the water's speed), then the amount of power which could be extracted from the flowing water would increase by a factor of 4×4× 4=64, i.e., by a factor of four (4) cubed. The power generated by the turbine could be increased by a factor of 64 by quadrupling the speed of water therethrough.

The following comments about the attributes of surface water waves pertain to those water waves classified as "deep water waves." Deep water waves move across the surface of a body of water whose depth equals or exceeds one-half of the wavelength of the waves. Furthermore, the following discussion pertains primarily to those deep-water waves classified as "swells." Swells are water waves having wavelengths varying from about forty (40) to four hundred (400) meters.

The "wavelength" of a deep-water wave is the distance over which the waveform repeats itself, i.e., from wave crest to wave crest. The height to which the wave crest is raised above the corresponding wave trough is the wave height.

Water molecules and other particles contributing to the propagation of deep-water waves have circular as distinguished from elliptical orbits. The radii of the orbits decrease exponentially with increasing depth. The radii become vanishingly small as the depth approaches one-half the wavelength of the waves. This special depth is called the "wave base." A deep-water wave does not move the water located below the wave base to any significant degree. The water below this depth and any objects floating in it are substantially stationary, even as waves move across the surface overhead.

The depth that defines the wave base for any particular wave or set of waves depends on the wavelength of that wave or set of waves. Waves with longer wavelengths affect the motions of water molecules at greater depths than waves with shorter wavelengths.

The motion of deep water waves is described by:

$$\psi_x(x,y,t) = re^{ky}\sin(\omega t - kx) + x$$

$$\psi_y(x,y,t) = re^{ky}\cos(\omega t - kx)$$

Notice that in this model every water particle moves in a circular motion. The circle is centered at the water's resting position and has radius of $re^{ky}$ where r is the amplitude of the surface wave and $-y$ is the depth below the surface. The radii of these circles decrease exponentially as the depth increases. Thus, even in stormy seas the water below the surface will be quite still.

The power generated by flowing water varies with the cube of the water's speed. The following excerpt explains this:

The instantaneous power density of a flowing incident on an underwater turbine is given by the following equation:

$$\left(\frac{P}{A}\right)_{Water} = \frac{1}{2}\rho U^3 \text{ (watts per square meter)}$$

where A is the cross-sectional area of flow intercepted by the device, i.e., the area swept by the turbine rotor (in square meters), $\rho$ is the water density in kilograms per cubic meter (1.0 kg/m³ for freshwater and 1.025 kg/m³ for seawater), and U is the current speed in meters per second. For tidal currents, U varies with time in a predictable manner as described previously, and also depends on depth beneath the water surface and position in the channel, as will be described later.

Power density varies with the cube of current velocity. Accordingly, it increases rapidly with current speed.

Deep-water waves move the water, and any objects floating in it, in circular orbits. However, the radii of those orbits decrease to zero as the depth of the water reaches and exceeds the "wave base." In other words, deep water waves do not significantly affect the location or movement of the water located at depths exceeding the wave base.

This means that when deep-water waves move across the surface of a body of water, those waves create a relative motion between the water at the surface of the body of water; and the water which is at least as deep as the wave base. While the water at the surface is moving in relatively large circular orbits in response to the passage of surface waves, the water below the wave base is not moving at all.

The two primary embodiments of this invention, i.e., the venturi-pinwheel and sea-anchor turbines, exploit this differential movement between the waters at the surface, and in the depths, which is induced by the passage of deep-water waves across the surface of a body of water. This has advantages over other known ocean-stimulated energy systems.

The known tidal flow turbines are large, complex and expensive. Their deployment is difficult. Moreover, large deployments are not possible, i.e., there are a limited number of locations where these devices can operate. They do not generate energy continuously because their energy source is available only during high tide or when tides are changing.

Wave-energy devices located on the shore derive their energy from breaking waves. However, they are aesthetically undesirable and they occupy valuable waterfront real estate. Large deployments are not possible because there are a limited number of locations where these devices can operate. They tend to have a negative impact on the shoreline ecosystem and they do not generate energy continuously.

Wave-energy devices that operate near a shore in relatively shallow water tend to be complex, high-maintenance and expensive. These devices are also aesthetically undesirable as they are usually visible from the shore. They can also disrupt local shipping. There are a limited number of locations where these devices can operate, and large deployments are not practical.

Wave-energy devices that operate off shore in relatively deep waters and are anchored or rest upon the ocean floor are complex, expensive to build and expensive to maintain.

Prior art wave-energy devices that float in the sea are also complex, expensive to build, and expensive to maintain.

The devices disclosed herein are relatively simple, inexpensive to build and maintain, and capable of producing large amounts of energy.

"The venturi effect is an example of Bernoulli's principle, in the case of fluid flow through a tube or pipe with a constriction in it. The fluid velocity must increase through the constriction to satisfy the equation of continuity . . . "

http://en.wikipedia.org/wiki/Venturi_effect

The continuity equation states that the fluid "mass flow rate"—the amount of fluid traveling through a tube per unit time—must be the same at any cross section of the tube or else there is an accumulation of mass—"mass creation"—and the steady flow assumption is violated. Simply stated:

(Mass rate)$_1$=(Mass rate)$_2$

Where

Mass rate=Density×Area×Velocity

This equation reduces to $\rho_1 A_1 V_1 = \rho_2 A_2 V_2$

Since the fluid is assumed to be incompressible, p is a constant and equation
reduces to $A_1 V_1 = A_2 V_2$ This is the simple continuity equation for inviscid, incompressible, steady, one-dimensional flow with no leaks. If a flow is viscous, the statement is still valid as long as average values of $V_1$ and $V_2$ across the cross section are used.

By rearranging equation [00052], the following is obtained:

$V_2 = (A_1/A_2) V_1$ http://www.centennialofflight.gov/essay/Theories_of_Flight/Conservation/T H8.htm Venturi tubes increase the speed of water by converting some of its "pressure" energy into directed kinetic energy. The magnitude by which the speed of water moving through a venturi tube is increased is equal to the magnitude by which the cross-sectional area of the channel through which the water must flow is decreased. For example, if the narrow, middle-portion of a venturi tube's channel (i.e. the "throat" of the venturi tube) has a cross-sectional area of only one-fourth that of the venturi tube's inlet, or "mouth," then the speed of the water flowing through the throat will be four (4) times greater than the speed of the water entering the venturi tube. The cross-sectional area of a circular channel is proportional to the square of its diameter. Accordingly, to increase the speed of the water flowing through the throat of a venturi tube, as compared to the speed of the water entering the tube, by a factor of four; it is only necessary to create a venturi tube with a throat possessing a channel diameter of one-half the diameter of the mouth of the venturi tube.

SUMMARY OF THE INVENTION

The long-standing but heretofore unfulfilled need for an improved device for harnessing the energy of waves is now met by a new, useful, and nonobvious invention.

The preferred embodiment of this invention is intended to operate while floating in the deep sea.

Unlike wave-energy devices that extract energy from tidal currents or changes in sea level, and those that operate on the shoreline, or in the shallower waters near shore, deep-sea wave-energy devices may be deployed on a massive scale because so much of the earth's surface is covered by the deep sea. This is an important advantage for any alternative energy device that hopes to significantly reduce the world's reliance on fossil fuels. Unlike the deep-sea wave-energy devices of prior art, this invention is highly efficient, simple, low-maintenance and inexpensive.

Thus, this invention enjoys every advantage found within the full family of wave-energy devices, while possessing none of the limitations.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
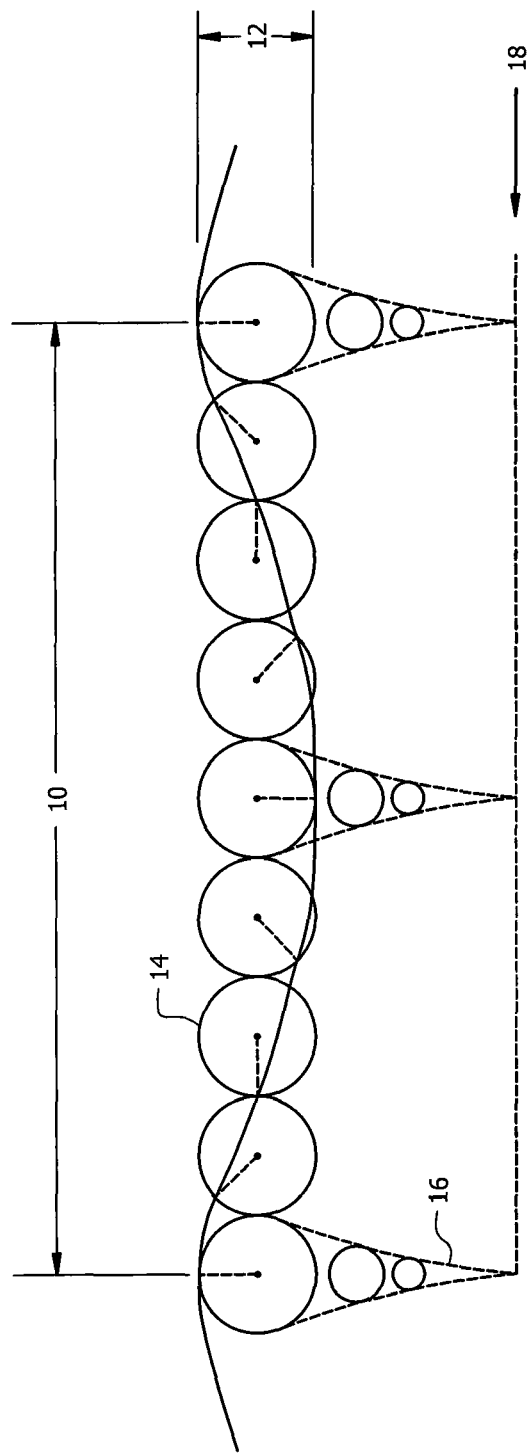
FIG. 1 is an illustration of the natural phenomenon by which the circular motions of water molecules characteristic of surface water waves quickly and exponentially diminish in diameter with increasing depth.

FIG. 1 illustrates properties of deep-water swells that are particularly relevant to the invention disclosed herein. The wavelength 10 of a deep-water wave is the distance over which the waveform repeats itself, i.e., from wave crest to wave crest. The height to which the wave crest is raised above the corresponding wave troughs is the wave height or amplitude and is denoted 12.

Water molecules and other particles contributing to the propagation of deep-water waves have circular, as distinguished from elliptical, orbits 14. The radii of such orbits decrease exponentially with increasing depth as indicated by the reference numeral 16. The radii become vanishingly small as the depth approaches one-half the wavelength of the waves. This special depth is called the wave base 18. A deep-water wave does not move the water located below the wave base to any significant degree. The water below this depth, and any objects floating in it are substantially stationary even when waves move across the surface. Waves, of course, do not really move across the surface of water; individual molecules of water are lifted momentarily by a pulse of energy and such individual molecules fall as soon as the energy passes. The result is an apparent traveling of a wave across a surface.

A first embodiment of this invention is a venturi-pinwheel turbine.

A pinwheel is a child's toy including a wind-rotatable propeller mounted on a stick. Relative motion between the propeller and ambient air effects rotation of the propeller about its axis of rotation. Thus, a child can effect rotation by moving the propeller if the wind is not blowing, or by holding the stick still and causing the propeller to face the wind if the wind is blowing.

Likewise, the venturi-pinwheel turbine incorporates a water turbine that is moved up and down through a body of stationary water or which remains stationary while water is displaced relative to it.

One novel aspect of this invention is that it uses a venturi tube, or similar device, to amplify the speed of water which may be induced to travel through a turbine suspended beneath the ocean surface from a buoy. Another novel aspect of this invention is that it can use either a solid (rigid) or a flexible means to suspend the venturi tube, or similar device, from the buoy.

Figure 2A:
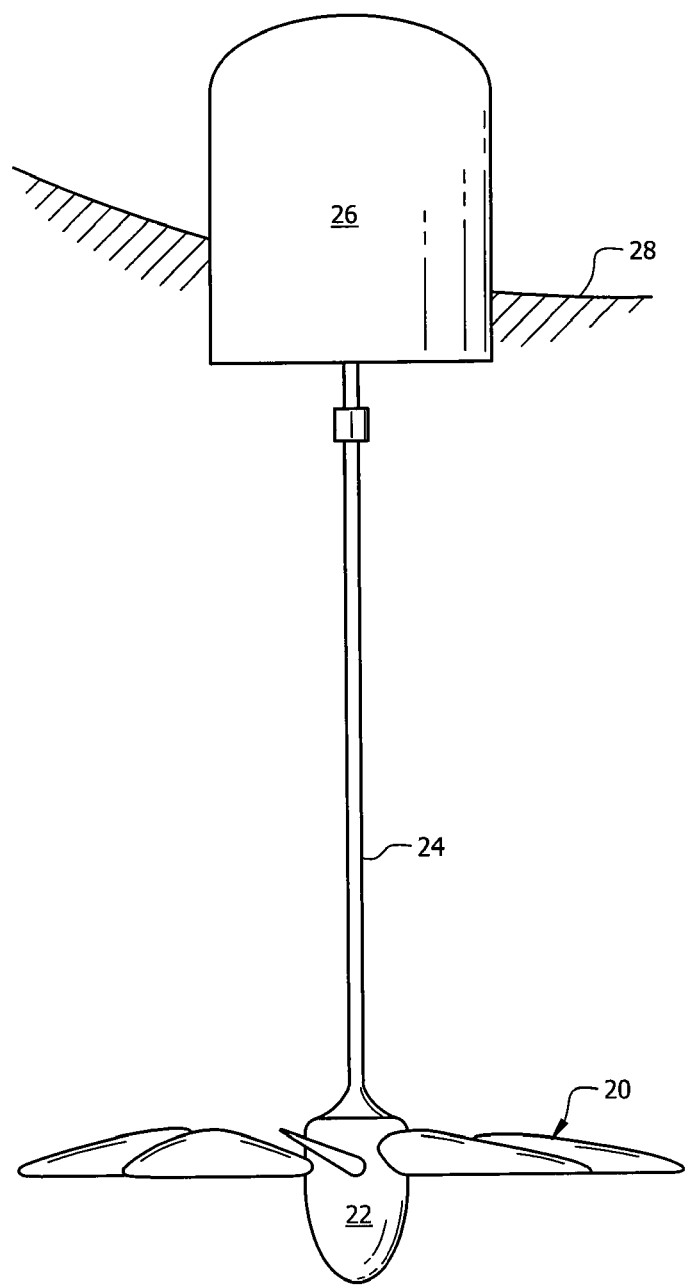
FIG. 2A diagrammatically depicts a prior art wave-energy device that exploits the diminution of wave motion with depth.

FIG. 2A depicts a prior art wave-energy device intended to exploit the diminution of wave motion with depth. It includes propeller blades 20 mounted to a hub 22. Shaft 24 interconnects hub 22 to buoy 26 that houses a turbine and generator, not depicted. The turbine rotates conjointly with shaft 24. As buoy 26 floats on the surface 28 of a body of water, the rising and falling of the buoy causes propeller blades 20 and hence shaft 24, the turbine, and the generator to rotate, thereby generating electricity.

Figure 2B:
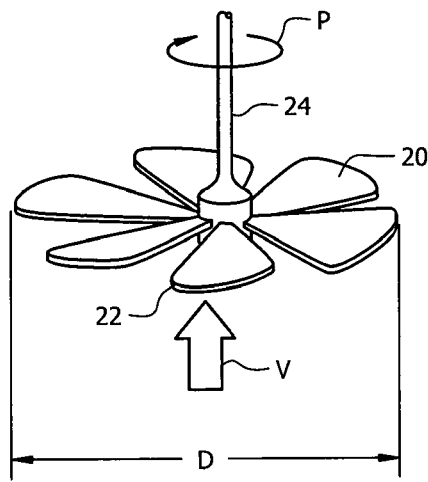
FIG. 2B diagrammatically depicts a prior art propeller that rotates responsive to a rising column of water.

FIG. 2B depicts a simple suspended propeller 20 such as the type depicted in FIG. 2A, i.e., the type disclosed in some prior art wave-energy conversion devices. Propeller 20 has diameter D and encounters a flow of water having velocity V. Some of the kinetic energy of the water is transformed into rotational kinetic energy P exerted by propeller shaft 24.

Figure 2C:
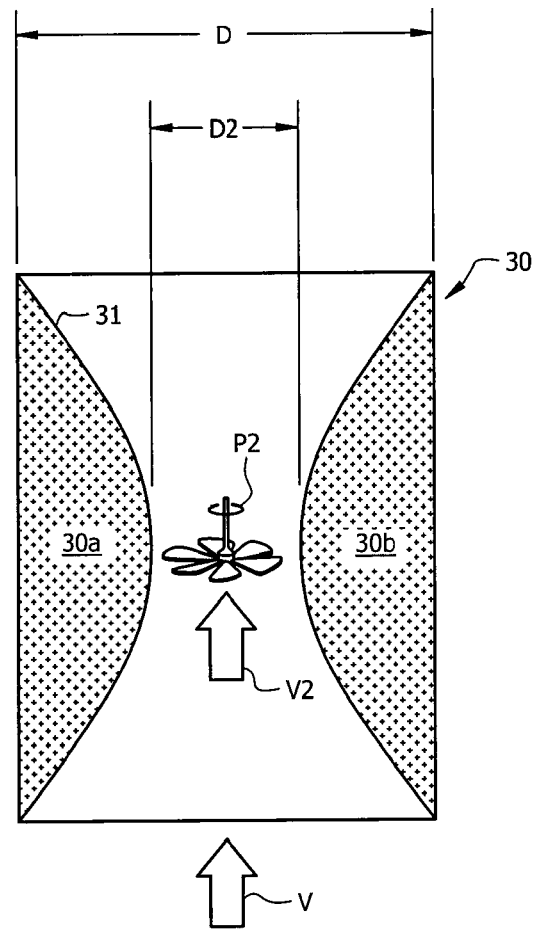
FIG. 2C is a diagram depicting a venturi turbine that forms a part of the preferred embodiment of this invention.

FIG. 2C depicts a novel wave-energy conversion structure 30 that forms a part of the preferred embodiment of this invention. Constrictions 30a, 30b reduce the diameter D of lumen 31 of venturi tube 30 to a smaller diameter D2. In this embodiment, the prior art propeller system of FIG. 2B is deployed in venturi tube 30 where the constriction is greatest and where the velocity of the water flowing therethrough is highest. The primary disclosure of this invention is the harnessing of the venturi effect to substantially increase the efficiency of a wave energy device; the type of propeller/turbine placed in the constriction is not critical to the invention. The velocity of water at arrow V is substantially less than the velocity of the water at arrow V2. The prior art includes no disclosure of a propeller/turbine positioned in the constricted part of a venturi tube.

Figure 3:
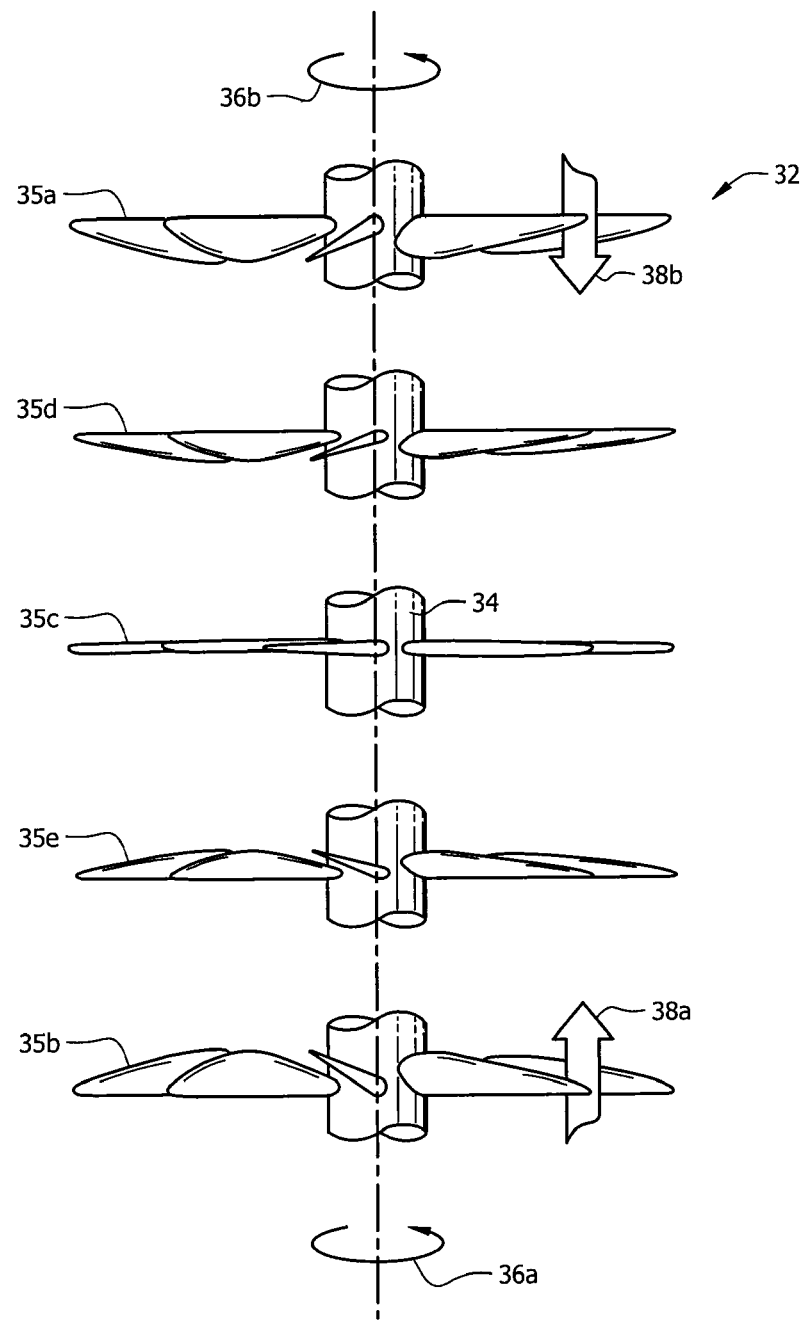
FIG. 3 diagrammatically depicts in side elevation a turbine design suitable for use in a venturi pinwheel wave energy device that converts energy in a bi-directional, oscillating vertical flow of water into a uni-directional rotational energy within the turbine's axle.

Prior art turbine 32 of FIG. 3 enables the energy in a bi-directional and oscillating vertical flow of water to be converted into a uni-directional rotational energy within axle 34. This type of bi-directional turbine is suitable for use within a venturi-pinwheel wave-energy device. FIG. 3 illustrates how a change in direction of water flow through the blades of the propeller does not result in a change in rotation direction of the shaft attached to such blades. The direction of the turbine's rotation remains the same whether the water flows from top-to-bottom, or from bottom-to-top.

More particularly, as indicated by directional arrows 36a, 36b, axle 34 rotates in the same direction independently of the direction of flow of water therethrough as indicated by confronting arrows 38a, 38b. Note that blades 35a at the top of the turbine are angled for maximum rotation caused by water flowing downwardly, blades 35b at the bottom are angled for maximum rotation caused by water flowing upwardly, that blades 35c in the middle are angled for flow in either direction, and that the intermediate top and bottom blades 35d, 35e, respectively, are not as steeply angled as the top and bottom blades.

Instead of a simple propeller of diameter D, a propeller of smaller diameter D2 may be used in a venturi tube having an inlet of the same diameter. The constricted throat of the venturi tube causes water flowing therethrough at speed V to be accelerated to speed V2. If the venturi tube illustrated in FIG. 2C were part of a closed water circuit, i.e. if each end of the venturi tube in FIG. 2C were attached to a pipe such that the water in the pipe were compelled to flow through the venturi tube and could not flow around it, then V2 would equal the following:

$$V2 = [(\Pi D^2/4)/(\Pi D2^2/4)]V = (D^2/D2^2)V$$

However, since the venturi tube in FIG. 2C does permit water to flow around it, as well as through it, V2 equals the following:

$$V2 = f(V)[(\Pi D^2/4)/(\Pi D2^2/4)]V = f(V)(D^2/D2^2)V$$

where "f(V)" is a characteristic function of the venturi tube.

The power generated by the propeller within the venturi tube depicted in FIG. 2C is equal to the following:

$$\text{Power}(P2) = k\,A2(f(V)V2)^3 = k(\Pi D2^2/4)[f(V)(D^2/D2^2)V]^3 = f(V)^3 k(\Pi D^6)/(4D2^4)V^3$$

The power generated by the simple propeller depicted in FIG. 2B is determined as follows:

$$\text{Power}(P) = k\,A^2 V^3 = k(\Pi D^2/4)V^3 = k(\Pi D^2/4)V^3$$

The increase in power obtained by using a venturi tube to accelerate the water flowing through the propeller, i.e., the ratio of P2 to P, is determined as follows:

$$P2/P = \frac{\text{Power }(P2) = f(V)^3 h(\Pi D^6)/(4D2^4)V^3}{\text{Power }(P) = k(\Pi D^2/4)V^3}$$

Assuming that the efficiencies of the two turbines "k" and "h" are roughly equal, then these factors cancel each other out, and:

$$P2/P = 0.125 D^4/D2^4$$

Assuming, for example, that D=2 meters, D2=½ meter, and f(V)=0.5, a venturi tube/turbine hybrid generates 0.125 ($2^4/0.5^4$)=32 times as much power as a simple propeller if both are moved through water at the same speed.

Where the difference in propeller diameter is even greater, such as D=2 meters, and D2=¼ meter, then the power extracted from the water by the venturi tube hybrid method is 0.125 ($2^4/0.25^4$)=512 times as great as that extracted by the simple propeller.

The venturi tube can be made out of low-cost materials such as concrete. The expensive, machined component, i.e., the propeller/turbine assembly, is much smaller in the venturi tube/hybrid design than in prior art inventions, such as that depicted in FIG. 2A. Therefore, as well as extracting much more power from the waves, the venturi-pinwheel wave energy device is much less expensive to manufacture than the devices of the prior art.

As used herein, the limitation "venturi tube" includes the use of any shell, tube surface, or other means, or combination thereof, that has the effect of increasing the rate at which water flows through a turbine, after having first been induced to flow by means of a motion coupled to the rising and falling of waves that are moving across the surface of a body of water in proximity to the venturi tube.

Any type of hydroelectric turbine adapted to operate efficiently in a river or stream could be adapted to operate efficiently within the lumen of the novel venturi tube. If a uni-directional propeller/turbine is employed, it will oscillate, i.e., change direction, in response to the changes in direction of the water flowing through the venturi tube. Such an oscillating rotation of a long shaft or cable results in large losses of energy due to internal twisting and spring actions within the shaft or cable. Accordingly, when a uni-directional propeller is employed, it is advantageous to convert the rotations of such a propeller into electrical energy in close proximity to the propeller/turbine, perhaps within or near the venturi tube itself.

If a bi-directional propeller/turbine is employed, it will rotate in the same direction even as the water flow changes direction within the lumen of the venturi tube. This facilitates the transfer of such rotational motion from the turbine to the buoy above. Due to the corrosive nature of sea water, and the desirability of reduced maintenance, it is beneficial to transmit the rotational kinetic energy produced by such a bi-directional turbine to the buoy, where it can be converted to electrical power by a generator protected from sea water.

Figure 4:
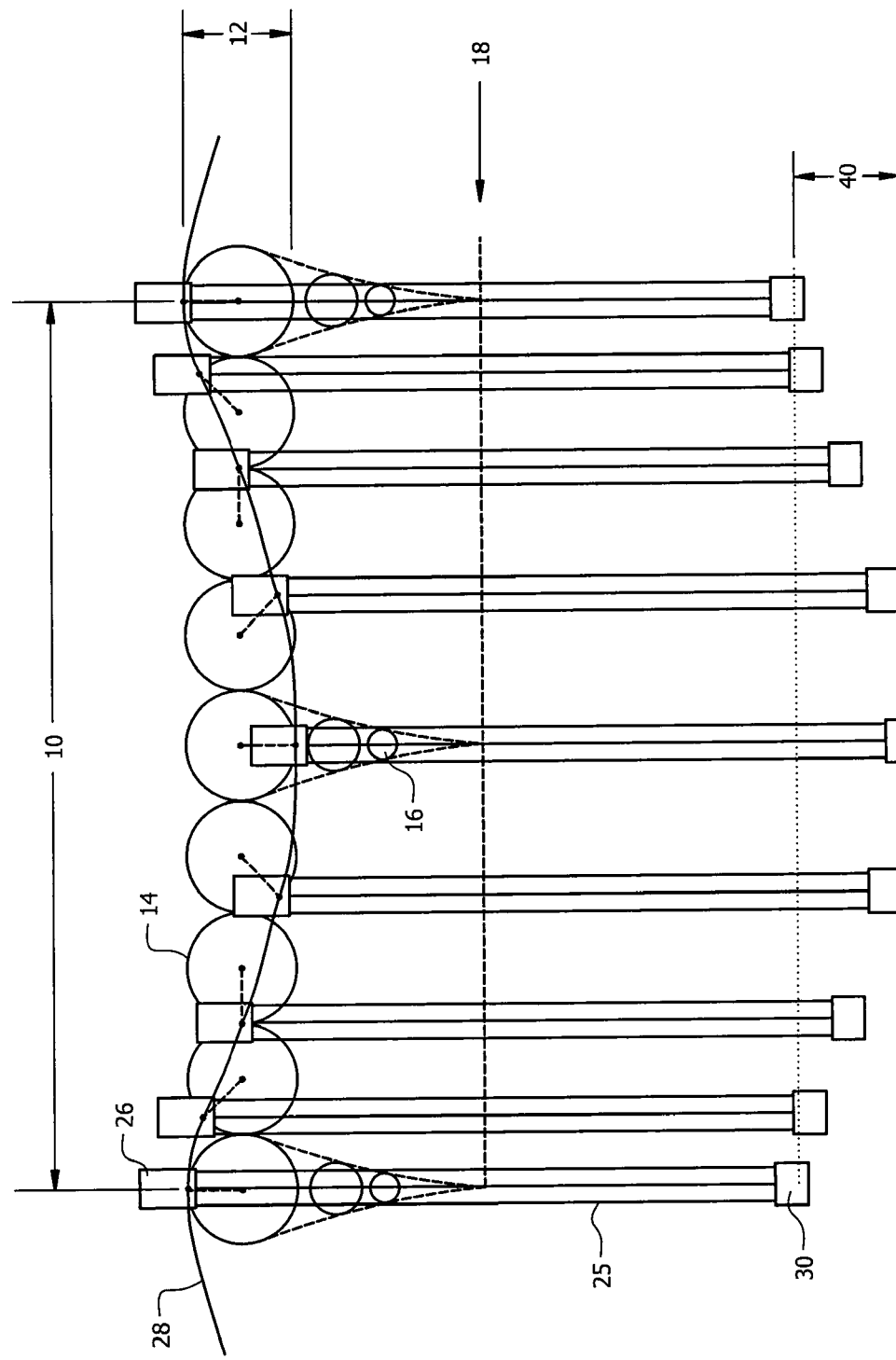
FIG. 4 is a side elevational illustration of the movement of a venturi pinwheel wave energy device in response to a passing wave.

FIG. 4 illustrates the principle by which the preferred embodiment of this invention translates the circular up-and-down motion characteristic of deep-water waves traveling across the surface of a body of water into a corresponding up-and-down motion of a venturi-pinwheel's underwater turbine, i.e., the venturi tube located far below the surface.

Buoyant flotation module or buoy 26 follows a circular up-and-down orbit 14 at the surface 28 of a body of water in response to the passage of deep-water waves across said surface. Buoy 26 constrains venturi tube 30 suspended beneath it by solid (rigid) struts, cables, or some other form of attachment, 25 to duplicate its vertical motion. A weight, not shown, may be suspended beneath each venturi tube 30 by solid (rigid) struts, cables, or by some other means, if the weight of the venturi tube is not adequate to restore it sufficiently quickly to its original depth. Said optional weight facilitates the downward, restorative movements of the venturi tube.

In the preferred embodiment, the up-and-down movements of each venturi tube 30 occurs at a depth where the water is relatively unaffected by the waves that move across the surface of the water, i.e., near or below wave base 18, and is therefore relatively motionless. The tube's up-and-down motion through the relatively still water near or below the wave base is equivalent to the tube being suspended at a stationary position within a stream of water having a reciprocating direction of flow.

The extent 40 of the venturi tube's vertical oscillation relative to the still water that surrounds it is equal to the height 12 of the deep-water waves responsible for the motion of flotation module 26, less the magnitude of any residual wave motion should the tube's minimum depth not equal or exceed wave base 18.

If the depth of venturi tube 30 beneath buoy 26 does not reach or exceed the depth defined as wave base 18, then the venturi tube will still experience a net relative vertical movement in relation to its surrounding water as it is displaced up and down by buoy 26.

The water molecules at the surface of the water follow circular orbits whose radii are equal to the full amplitude of the deep-water waves moving them. The circular orbits induced by the wave in the water molecules located below the surface become progressively and exponentially smaller as the depth increases. Therefore, regardless of the depth at which the venturi tube is suspended, as long as it is suspended below the surface, the circular orbit through which it is dragged by flotation module 26 will be greater than the circular orbits of the water molecules surrounding said venturi tube.

Because the radius of the venturi tube's elliptical orbit always exceeds the radii of the circular orbits of the water molecules surrounding it, there is a net relative up-and-down motion between the venturi tube and its surrounding water. The magnitude of the relative up-and-down motion of the venturi tube with respect to its surrounding waters is greatest when the venturi tube is suspended below wave base 18, where the surrounding water is still. At such depth, the magnitude of the venturi tube's relative up-and-down motion is equal to the full height of the surface waves. Such magnitude is non-zero and non-trivial at any depth representing a non-trivial portion of the distance from the surface to the wave base. This is true because the radii of the circular orbits of the water molecules below the surface decrease exponentially, not linearly, with increasing depth.

See http://hyperphvsics.phy-astr.gsu.edu/hbase/waves/watwav2.html

See also "deep water waves" at http://users.dickinson.edu/~richesod/waves/applets.html.

Novel flotation module 26, like any buoy, ship or other floating object, rises and falls on the passing waves. The rising flotation module pulls the attached venturi tube with it. As the flotation module or buoy falls along the trailing edge of a wave that is passing, the attached venturi tube is no longer supported. Thus it sinks under the influence of gravity due to its mass and the mass of any attached supplemental weight.

Surface waves are associated with cycles of circular motions on the part of water molecules at the surface. At the surface, the radii of these circular motions are equal to the amplitude of the surface waves themselves. However, at increasing depths, the radii of the circular motions that characterize the movements of the water molecules quickly, and exponentially, diminish.

Figure 5A:
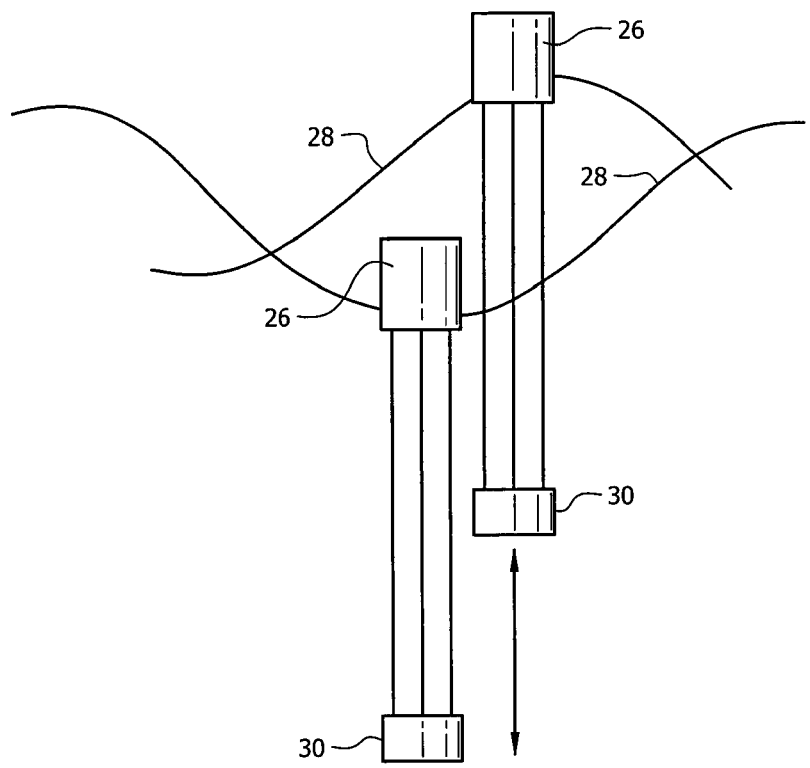
FIG. 5A is a side elevational diagram depicting motion of the novel venturi-pinwheel turbine through its surrounding waters.
Figure 5B:
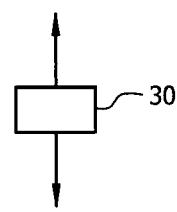
FIG. 5B is a side elevational diagram depicting the equivalent relative motion of water through the novel venturi-pinwheel turbine.

The amplitude of the tube's vertical movements matches the amplitude of the flotation module driving those movements. However, because the venturi tube's depth places it in the midst of water which is either not matching the circular movements characteristic of the waters above, or is matching those movements but at a greatly reduced scale, the tube's movements do not match those of the water molecules surrounding it. Thus, as depicted in FIG. 5A, with respect to the relatively stationary water below the surface, venturi tube 30 is pulled and dropped through said water. As depicted in FIG. 5B, relative to tube 30, the water surrounding said tube rises and falls through the tube. To move up and down, water must flow through the lumen of the venturi tube.

In the preferred embodiment of this invention, a kinetic turbine/propeller is positioned within the narrowest part of the venturi tube, as mentioned above in connection with FIG. 2C. It uses the reciprocating water motion to turn the turbine rotor. Any kind of water-operated turbine can be used within the scope of this invention.

The rotational mechanical energy generated by the turbine is, in the preferred embodiment of this invention, transmitted to buoy 26 where a generator or alternator converts it to useful electrical energy.

Figures 6A, 6B:
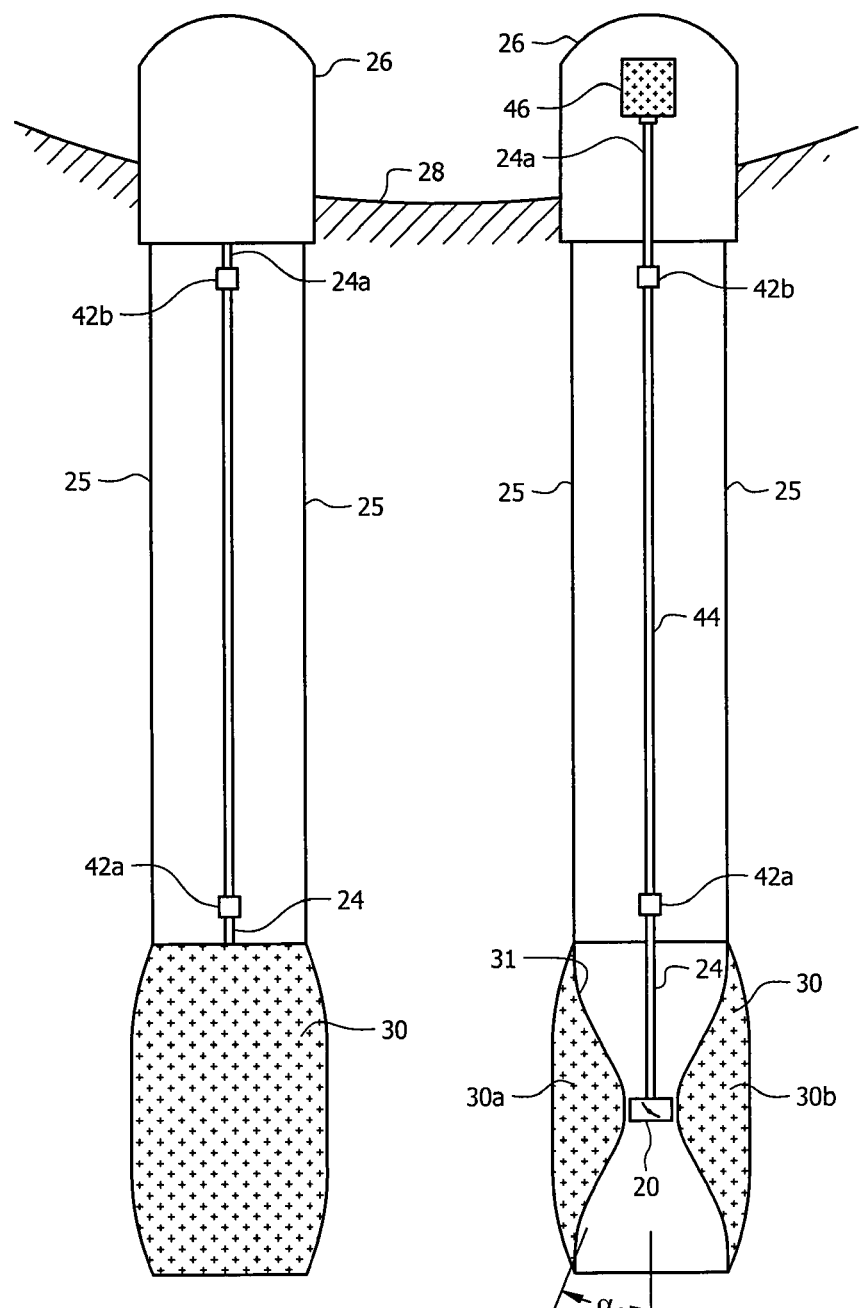
FIG. 6A is a side elevational view of one embodiment of the venturi pinwheel wave energy device.
FIG. 6B is a longitudinal sectional view of the embodiment of FIG. 6A.

FIGS. 6A and 6B illustrate one embodiment of this invention. FIG. 6B is a cross-sectional view of the venturi pinwheel turbine assembly. The lumen of venturi tube 30 is denoted 31 as aforesaid. The outer wall of venturi tube 30 is slightly convex.

The venturi pinwheel turbine operates in a body of water. It responds to waves moving across the surface of that body of water by rising and falling in synchrony with the rising and falling of the waves.

Venturi tube 30 may be suspended by flexible but non-stretchable cables 25 beneath flotation module 26. However, the preferred embodiment disclosed in FIGS. 7C and 7D utilizes solid (rigid) struts for this purpose. If cables are used, then the venturi tube's distance beneath buoy 26 is held constant, and tension is maintained in cables 25 by the weight of tube 30 and of any optional attached supplemental weight suspended beneath it.

The venturi tube's efficiency is maximized by suspending it below, or at least as near as possible to, the wave base characteristic of the longest wavelength of waves for which energy conversion is desired. This preferred depth would typically range from twenty (20) to one hundred (100) meters. FIGS. 6A and 6B are not drawn to scale.

As venturi tube 30 rises, water flows through lumen 31 from top-to-bottom. As venturi tube 30 sinks, water flows through lumen 31 in the opposite direction. As the water flows through the lumen, its rate of axial flow (i.e. its speed) increases as the cross-sectional area of the lumen is reduced (within a certain range of lumen diameters). For example, as the cross-sectional area of the lumen is halved, the speed of the water flow is approximately doubled.

The type of turbine most suitable for use within a venturi tube is the family of turbines known as free flow or kinetic turbines. Simple propeller 20 is indicated in FIG. 6B for convenience. To avoid confusion, it should be understood that venturi tube 30 refers to a housing whereas turbine 20 refers to a propeller, impeller, or other water-rotated device mounted in the constriction created in lumen 31 of tube 30.

As water is constrained to flow through lumen 31, the turbine's blades must rotate. The blades are joined to hub 22 (see FIG. 2B) and said hub rotates conjointly with turbine central shaft 24. If the turbine blades are bi-directional, shaft 24 rotates in the same direction regardless of whether water is entering tube 30 from the top or bottom. Only the angular speed of rotation varies as the tube moves up and down through the water. The angular direction of rotation does not vary.

As venturi tube 30 rises and falls in the water beneath the surface, water enters the tube alternately from the top and bottom, and compels turbine 20 to spin. Turbine shaft 24 is connected by connector 42a to a solid shaft, or a flexible but non-stretchable cable, or some other means of transmitting rotational mechanical energy 44, and said shaft, flexible cable, or other connector, is connected by connector 42b to central shaft 24a of buoy 26 which central shaft is connected to generator 46 or some other energy conversion device.

Accordingly, rotation of turbine/propeller 20 causes rotation of central shaft 24, shaft, cable, or other connector 44, buoy shaft 24a and hence generator 46.

In this manner, some of the energy of the deep-water waves which compel buoy 26 and its attached venturi tube 30 to rise is converted to mechanical energy. The potential energy of venturi tube 30 increases with its height. Some of the tube's potential energy that remains after a wave has passed is converted into additional mechanical energy as buoy 26 and its attached venturi tube 30 fall and again cause the rotation of turbine/propeller 20, central shaft 24, shaft, cable, or other means 44, buoy shaft 24a and generator 46. All or most of the mechanical energy created during the rising and falling of venturi tube 30 is available for conversion into electrical energy.

The angle α defining the venturi tube's lumen is indicated in FIG. 6B. The scope of this invention includes the use of venturi tubes of any angularity, as well as to traditional conical venturi tubes, or any other form or guide capable of accelerating water in a manner consistent with the "venturi effect." To adapt to differing wave conditions and environments, this invention can utilize venturi tubes with conical lumens that are broad and relatively flat, or conical lumens that are narrow and relatively long. The scope of this invention includes the use of venturi tubes of all shapes, radial angularities, and sizes.

When buoy 26 and venturi tube 30 are vertically spaced apart from one another by a maximum distance and said venturi tube is neither rising nor falling, venturi tube 30 is in a position of repose. When a wave raises buoy 26, attached solid strut 44 lifts the attached venturi tube 30, thereby generating electricity. Alternately, if cables are employed, then tension in cable 44 increases and venturi tube 30 is lifted, thereby generating electricity. As the buoy falls after the passage of a wave, venturi tube 30 sinks back to its position of repose, generating electricity as it sinks. The venturi tube/shaft 30 or cable 44 assembly (including any supplemental weight) has a specific gravity sufficient to cause it to sink in sea water.

The preferred embodiment of this invention includes solid (rigid) struts to connect a venturi tube to a buoy from which it is suspended. However, rigidly connecting the buoy to a tube submerged to a depth of twenty to one hundred meters (20-100 m) may result in some strain of the rigid connectors. Such struts must therefore be capable of sustaining sufficient strain so that they may function in rough seas without failure or deformation. The use of flexible cables to connect the buoy to the submerged venturi tube may offer a simpler and less expensive alternative in some cases.

Buoy 26 moves in approximately circular vertical motions at the surface. Being connected to the buoy, the submerged venturi tube must move in synchrony with the buoy. However, because of the drag induced by the venturi tube when a force compels it to move in a horizontal direction, i.e., parallel with the mean level of the surface, the venturi tube is unable to match the buoy's unfettered horizontal components of movement. Therefore, while the buoy moves in vertical circular motions at the surface, the motions of the submerged venturi tube follow an elliptical path in which the long axis of the ellipse is vertically oriented.

The embodiment of the venturi tube depicted in FIGS. 6A and 6B has a slightly convex outer cylindrical wall. Such rounding may help to minimize turbulence as the venturi tube moves through the water.

Figures 7A, 7B:
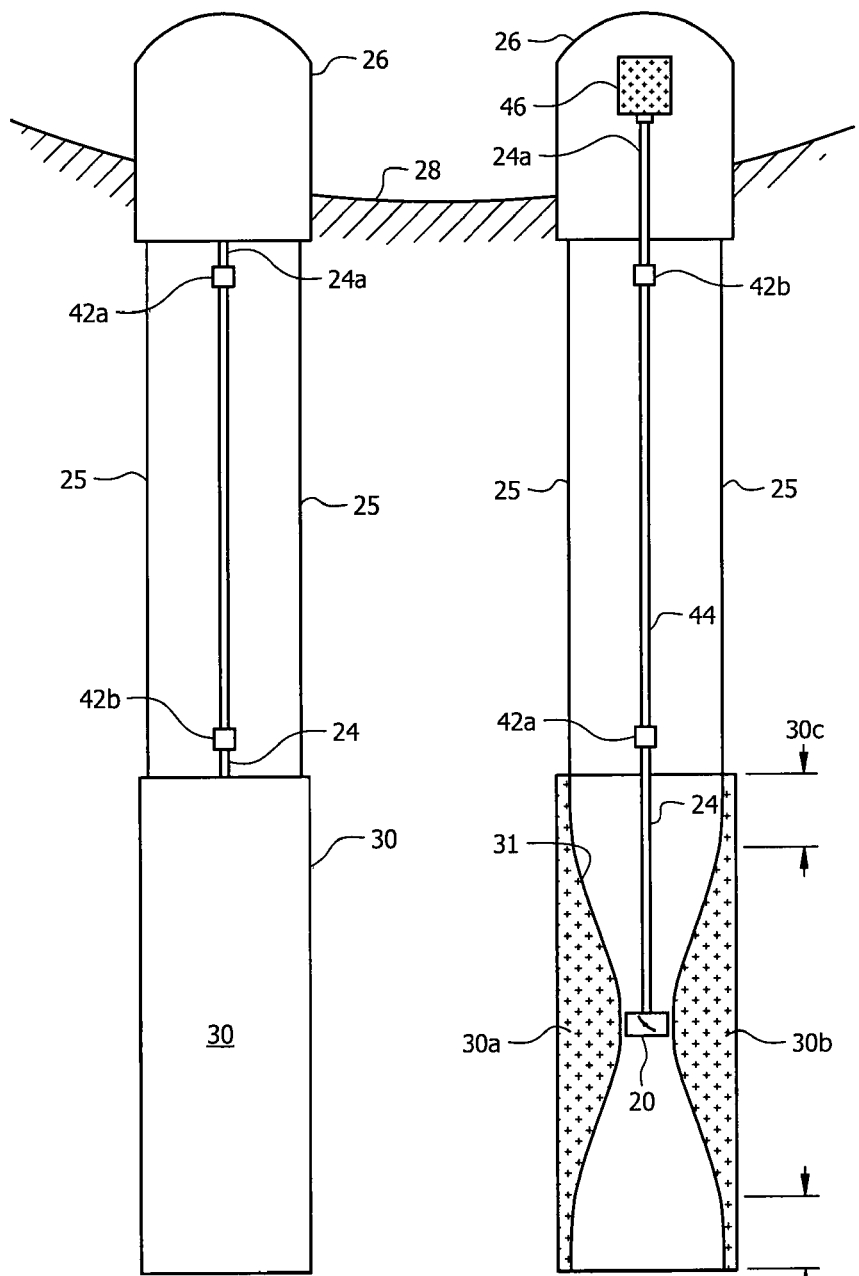
FIG. 7A is a side elevational view of the preferred embodiment of the venturi pinwheel wave energy device having an elongated turbine housing.
FIG. 7B is a longitudinal sectional view of the structure depicted in FIG. 7A.

FIGS. 7A and 7B depict the preferred embodiment of the invention. This embodiment employs a structural feature that increases the efficiency of power extraction from the water induced to flow through a venturi tube. The cylindrical wall of venturi tube 30 is extended at the top and bottom of the tube illustrated in FIGS. 6A and 6B so that the constricted lumen 31 of venturi tube 30 is positioned further from the opposite ends of said venturi tube. In other words, the constriction in the lumen is spaced away from opposite ends of venturi tube 30 so that a substantial length of said lumen on opposite ends of said constriction is not constricted.

This improves the efficiency of the turbine by reducing the amount of water that flows around the outer wall of the venturi turbine instead of flowing through its lumen and the turbine therein.

More particularly, venturi tube 30 is extended in a longitudinal direction away from the constriction. Extension 30c extends upwardly from the upper mouth of venturi tube 30. Extension 30d extends downwardly from the lower mouth of the venturi tube. This may improve the performance of the venturi tube by reducing the amount of water which "leaks" out of the venturi tube by traveling over the outer sidewall instead of through lumen 31 of venturi tube 30.

Figure 7C:
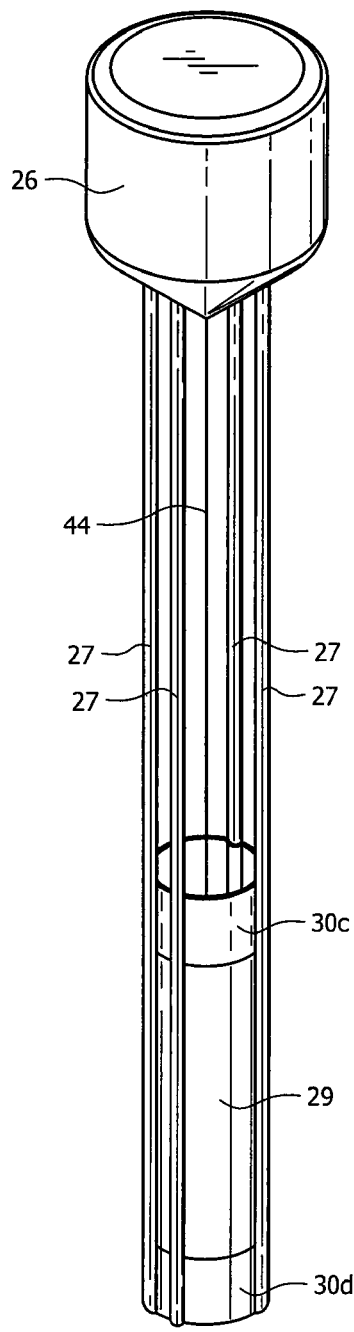
FIG. 7C is a side elevational view of the preferred embodiment of the venturi wave energy device.
Figure 7D:
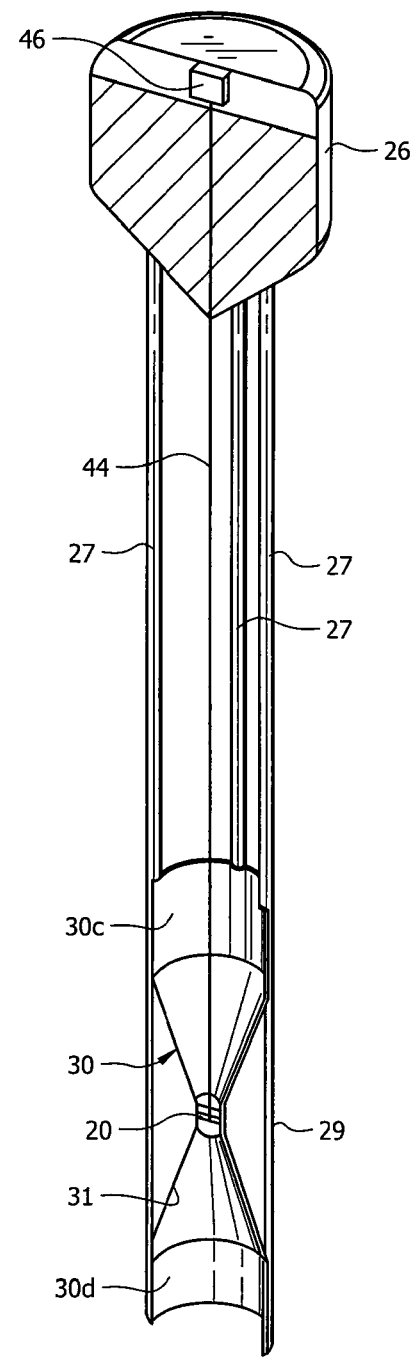
FIG. 7D is a longitudinal sectional view of the embodiment of FIG. 7C.

FIG. 7C is a perspective view of the preferred embodiment of the venturi wave energy device and FIG. 7D is a longitudinal sectional view thereof.

Venturi tube 30 is housed within and secured to outer cylindrical casing 29. Rigid struts 27 maintain a fixed distance between buoy 26 and said casing 29 and hence said venturi tube.

Turbine 20 may be any preselected type of turbine. Turbine 20 effects rotation of rod 44 so that generator 46 generates electricity. Reference numeral 46 may also indicate a different type of transducer.

The rigid interconnection of buoy 26 and venturi tube 30 and its related assembly translates all buoy motion to said venturi tube and assembly.

Figures 8A, 8B:
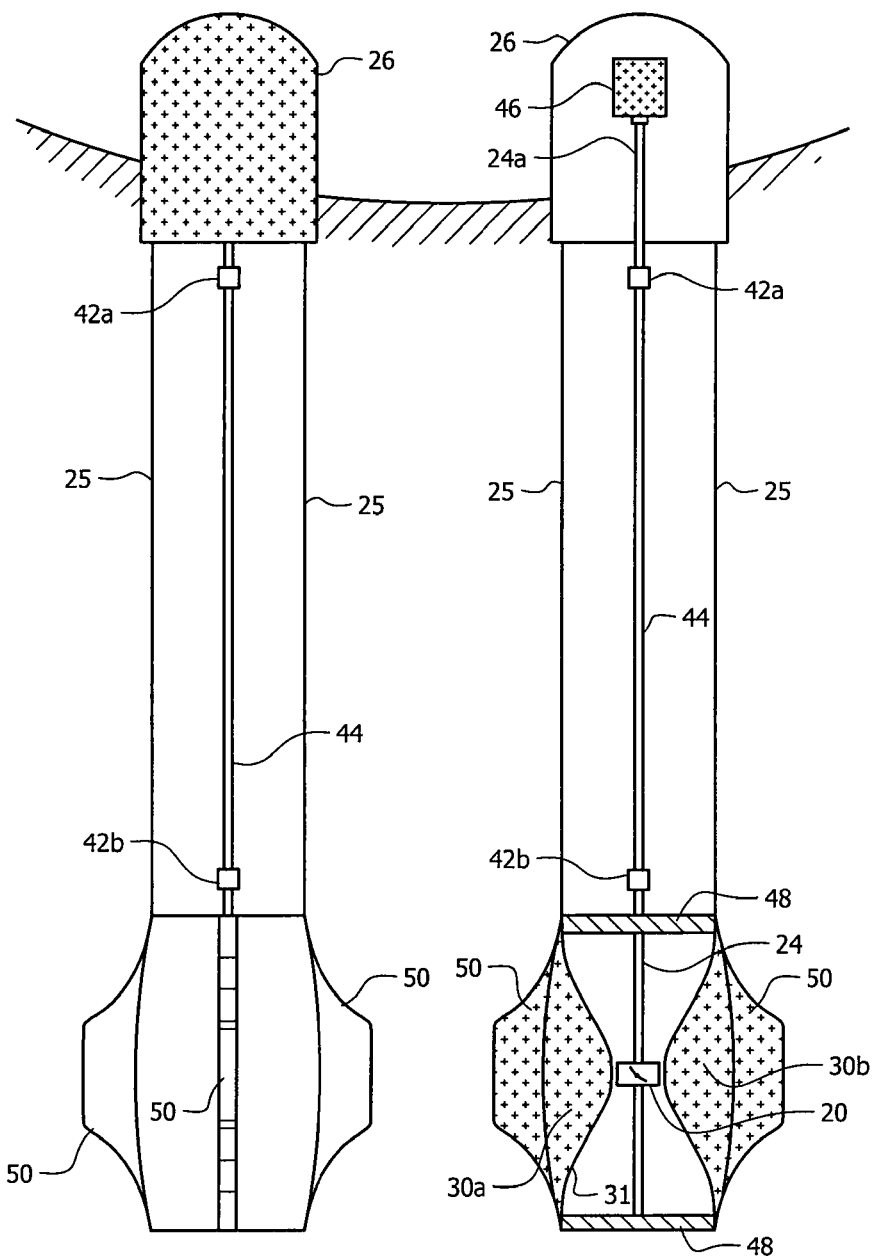
FIG. 8A is a side elevational view of a third embodiment of the novel venturi pinwheel wave energy device illustrating the use of optional "swirl" and "counter-rotation" inducing members.
FIG. 8B is a longitudinal sectional view of the embodiment of FIG. 8A.

The embodiment of FIGS. 8A and 8B adds vanes 48 to impart an initial swirling motion to water entering venturi tube 30. As best depicted in FIG. 8B, a set of vanes 48 is positioned at each end or inlet of venturi tube 30 so that individual water molecules flowing through lumen 31 will follow a helical or swirling path. As the swirling water flows through lumen 31, and as the speed of the water increases, the water's rate of rotation also increases as a result of the conservation of angular momentum.

Vanes 48 at each mouth of lumen 31 are oriented to induce the same direction of rotation in the water regardless of the axial direction in which the water is flowing. In other words, regardless of whether the water is flowing through the lumen from top-to-bottom or bottom-to-top, the vanes induce the water to swirl in the same direction around central shaft 24.

The addition of radial flow to the axial flow of water through lumen 31 allows the water to strike the blades of some kinds of turbines at a more advantageous angle of attack, causing the water to impart more of its kinetic energy to the turbine than if the water's flow lacked a significant radial component.

However, the inlet vanes impart a small rotation to venturi tube 30 itself, as distinguished from turbine 20. This rotation of venturi tube 30 as a whole might cause corresponding rotation of the attached buoy. Such rotation might cause difficulties within a network of linked venturi-pinwheel wave-energy devices. However, such rotation may be suppressed or inhibited through the inclusion of vertical wings 50 that extend radially outwardly from venturi tube 30, or from other such devices that convert some of the vertical kinetic energy of venturi tube 30 into rotational kinetic energy imparted to venturi tube 30 as a whole.

The radial lift provided by vertical wings 50 is adjusted to approximately cancel any remaining net radial forces imparted to venturi tube 30.

Figure 9:
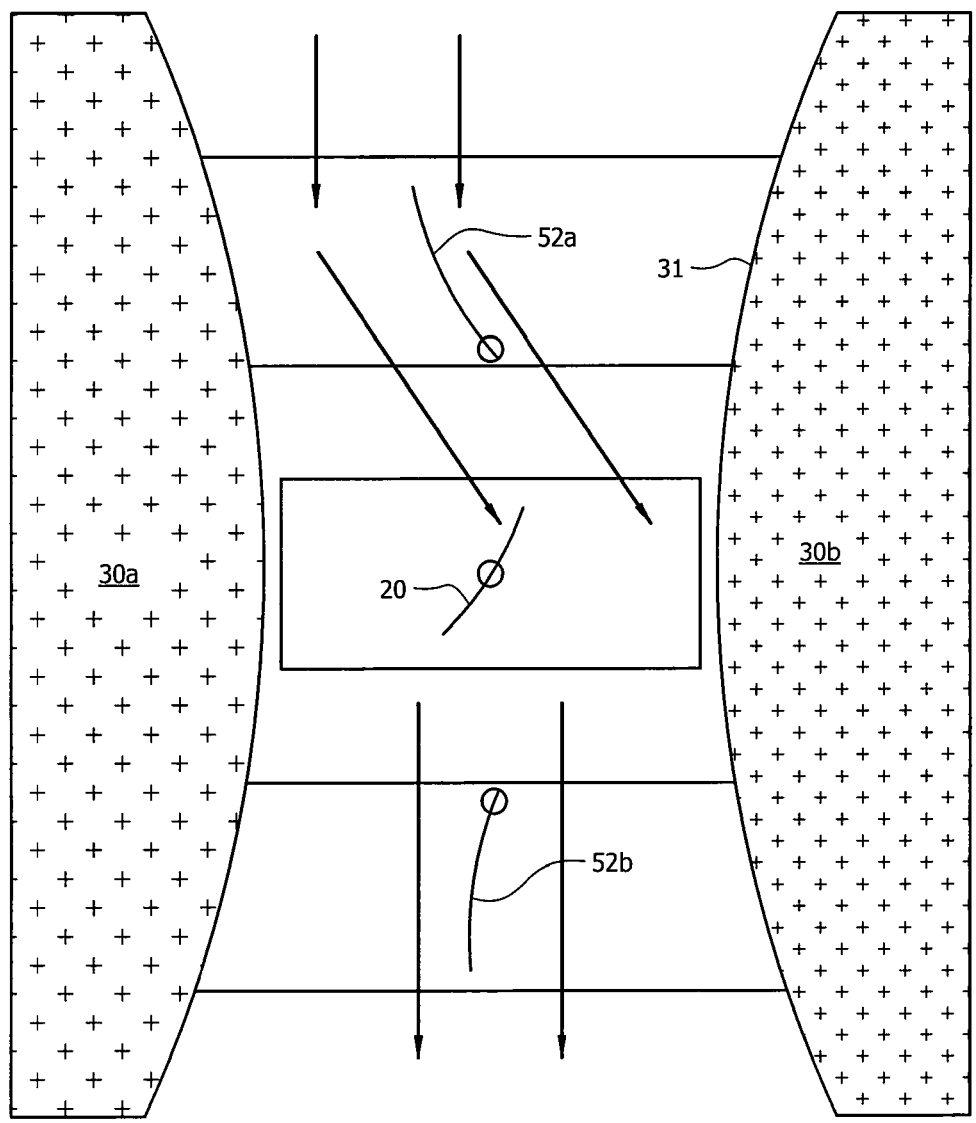
FIG. 9 is a side elevational diagrammatic depiction of a fourth embodiment that includes movable vanes positioned upstream and downstream of a central turbine having bi-directional blades.

FIG. 9 depicts another optional structure for increasing the efficiency of power extraction from the water induced to flow through venturi tube 30.

Instead of inducing a swirling motion in the water as it enters the mouth or inlet of the venturi tube, a set of radially-oriented, bi-directional vanes 52a, 52b is positioned immediately above and below propeller-type turbine 20. If water is flowing through lumen 31 in a top-to-bottom direction, vanes 52a are pre-turbine vanes and they induce a more favorable angle of attack in the water's flow immediately before the water encounters propeller/turbine 20. In reaction to water flowing from top-to-bottom, vanes 52a assume an orientation in which they impart the desired radial component to the flow of water when the water is flowing toward turbine 20. However, when the water is flowing away from the turbine, post-turbine vanes 52b assume a neutral orientation in which they passively conform to the water's inherent flow and avoid altering the post-turbine pattern of flow. The vanes perform in an opposite way when water flows through lumen 31 in a bottom-to-top direction.

Vanes 52a, 52b also impart a small rotation to venturi turbine 30 as a whole. The rotation is corrected by radial wings 50, or other such devices, as in the embodiment of FIGS. 8A and 8B.

Figure 10:
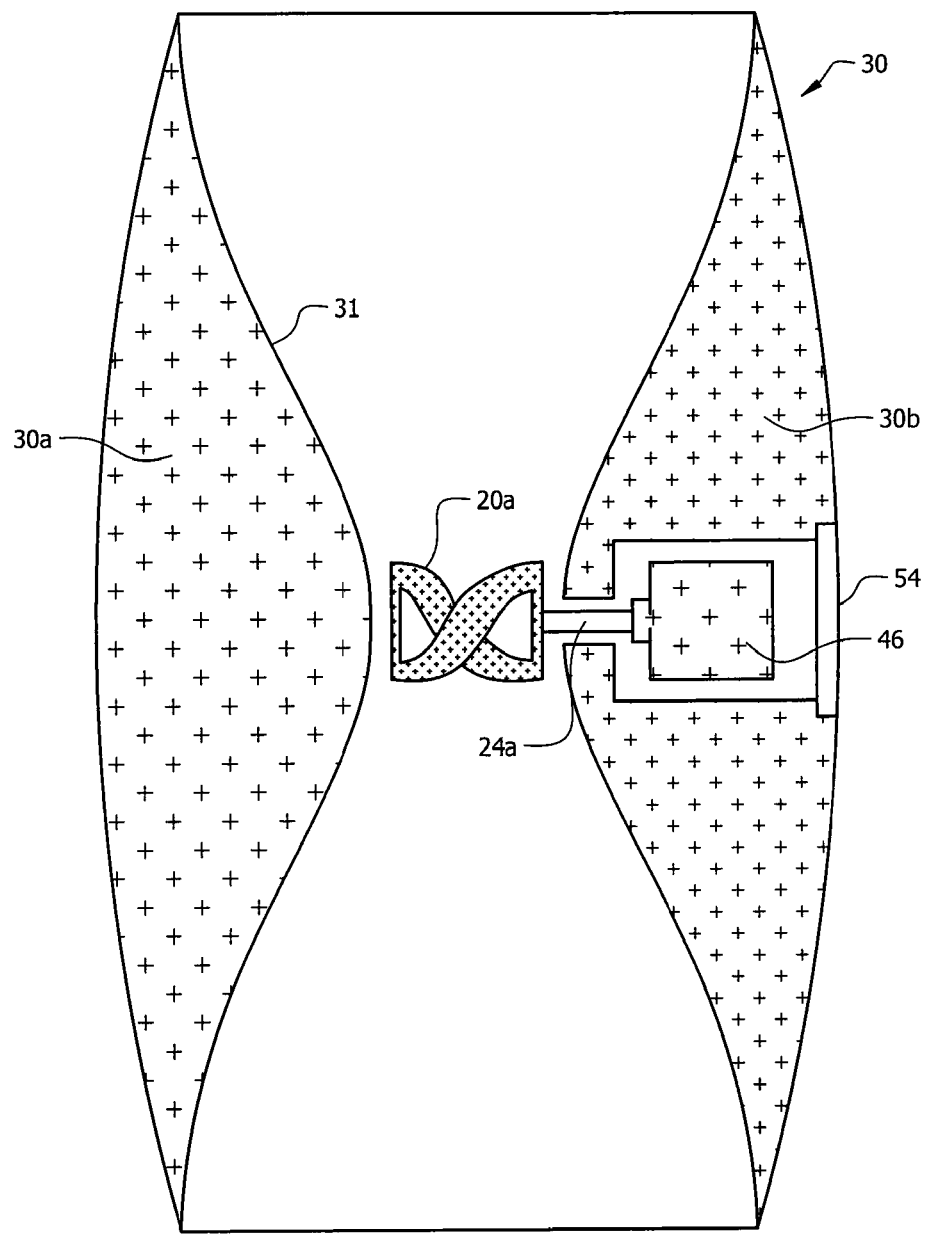
FIG. 10 is a side elevational diagrammatic depiction of a fifth embodiment of the novel venturi pinwheel wave energy device having a turbine that rotates about an axis perpendicular to the flow of water through the venturi turbine.

FIG. 10 depicts a perpendicular-axis turbine 20a. Perpendicular-axis turbines respond to fluid flowing in any direction normal to their axes. This type of turbine therefore extracts energy from the water flowing through lumen 31 of venturi tube 30 regardless of the vertical direction of the water's travel. Water entering either mouth of lumen 31 induces the same rotational motion in perpendicular-axis turbine 20a. Such a turbine can be attached directly to an alternator or generator 46 by a shaft or the turbine's rotational energy can be transmitted by any combination of solid (rigid) or flexible shafts to buoy 26.

If an alternator or generator 46 is located within the sidewalls of venturi tube 30 as depicted in FIG. 10, the electrical energy generated in response to the rotation of said perpendicular-axis turbine 20a is transmitted to the surface via one or more electrical conductors. Such conductors extend along one or more of the cables 24 supporting venturi tube 30 beneath buoy 26.

Access panel 54 performs the function its name expresses.

Figure 11:
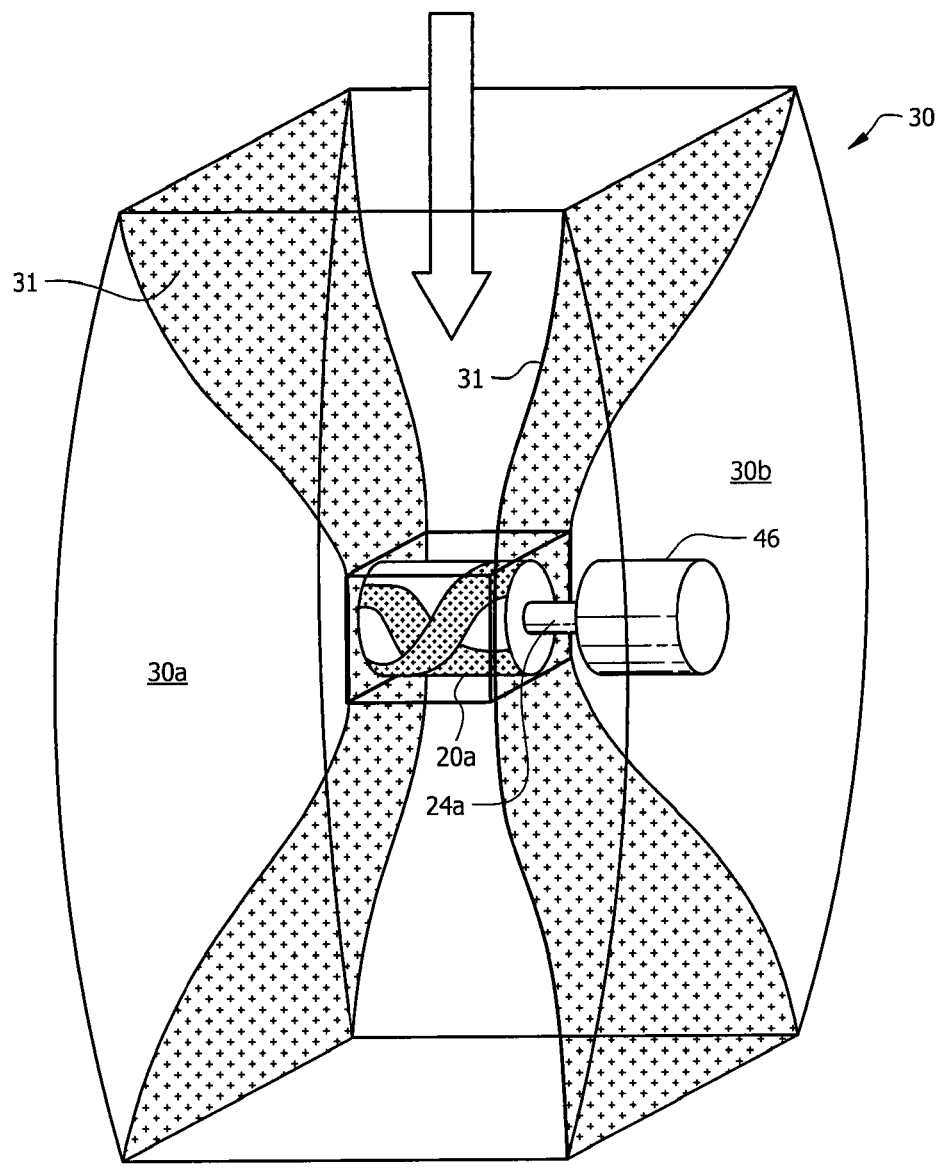
FIG. 11 is a perspective view of the embodiment of FIG. 10, but with said embodiment modified to have a rectangular housing.

FIG. 11 is a perspective view of a venturi tube 30 similar to the one depicted in FIG. 10. However, the venturi tube 30 depicted in FIG. 11 has a rectangular symmetry, as distinguished from the radial symmetry of turbine 20 depicted in FIG. 10.

When it is preferred that the portion of the venturi tube where a perpendicular-axis turbine is located be rectangular in cross-section, the interior of the venturi tube may also be rectangular.

Figure 12:
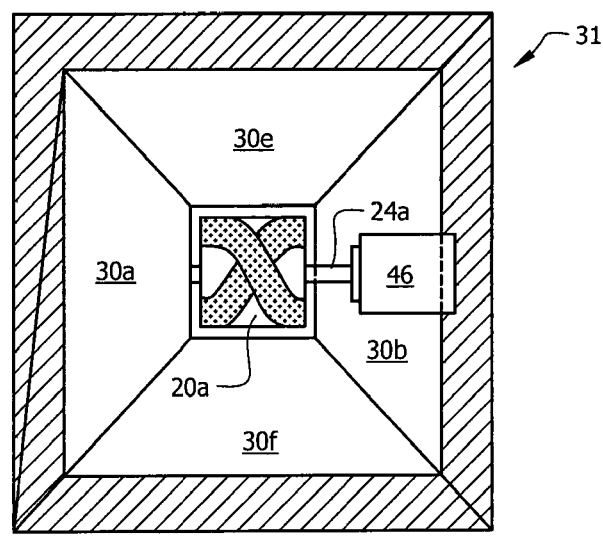
FIG. 12 is a plan view of the embodiment of FIG. 11.

FIG. 12 is a plan view of a rectangular venturi turbine housing 31. This drawing illustrates the importance of having perpendicular-axis turbine 20*a* positioned within a rectangular channel to maximize the flow of water through the turbine, as distinguished from around the turbine. The rectangular channel, or lumen, is defined by sidewalls 30*a*, 30*b*, 30*e*, and 30*f*.

Figure 13:
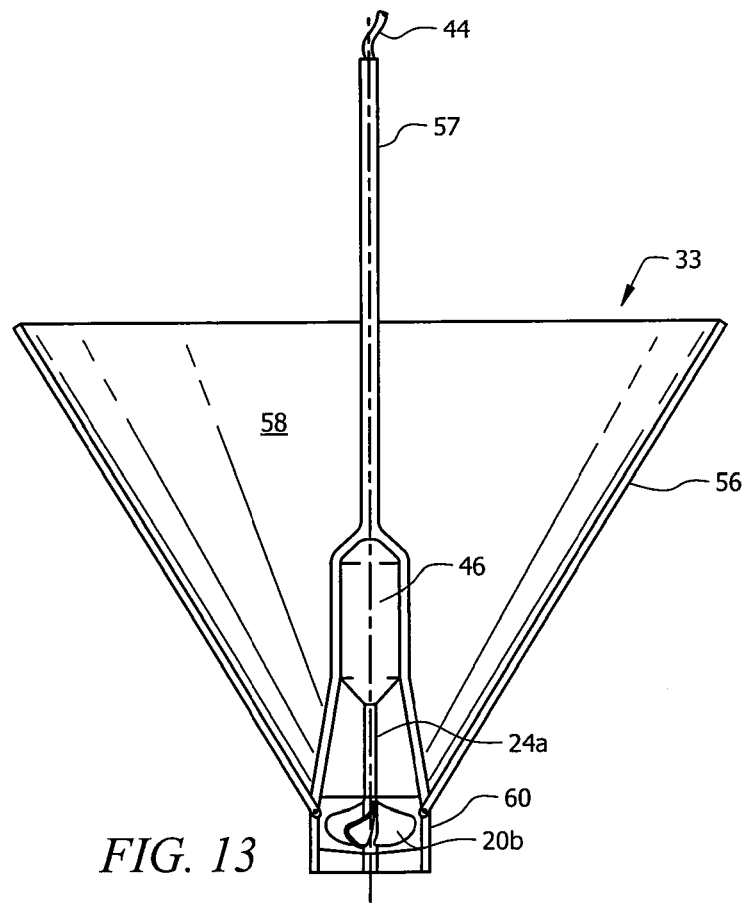
FIG. 13 is a side elevational diagrammatic depiction of a portable embodiment of the invention.
Figure 14:
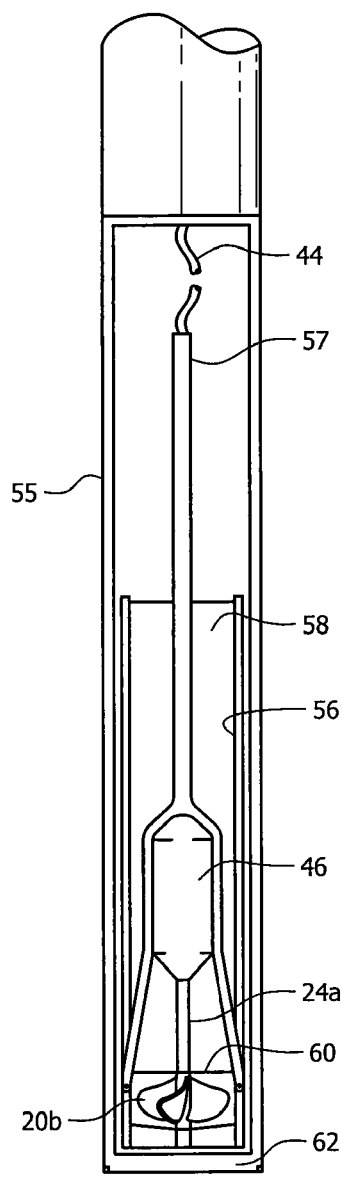
FIG. 14 is a side elevational diagrammatic depiction of the embodiment of FIG. 13 when stored in a canister.
Figure 15:
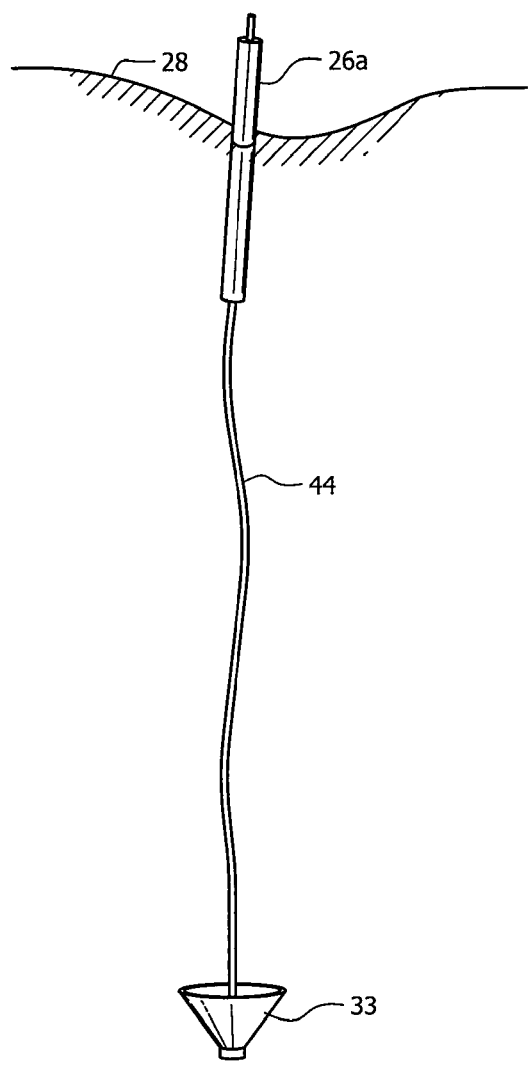
FIG. 15 is a side elevational diagrammatic depiction of the embodiment of FIGS. 13 and 14 when in use to provide power to a small buoy.

The design of the preferred embodiment of the venturi-pinwheel wave-energy device can be modified in a number of ways to accommodate its use with small buoys or devices where it may serve as a power source for the buoy. FIGS. 13-15 depict the preferred embodiment of such a portable version of the venturi-pinwheel wave-energy device.

In this portable embodiment, venturi tube 30 is replaced by either a flexible or rigid venturi shroud 33, having a conical shape much like that of an inverted lamp shade or parasol. In order to facilitate storage and deployment, the venturi turbine may be made sufficiently small to fit within the body of a canister 55 (FIG. 14) where it may be stored prior to deployment, as best understood in connection with said FIG. 14.

Venturi shroud 33 may be rigid or have a collapsible structure. If the shroud is made collapsible, then rigid frame members or ribs 56 and flexible fabric 58 may be included to enable the structure to fold like an umbrella. Shroud 33 may remain in a collapsed configuration until after deployment and separation from storage canister 55.

Instead of a large intrinsic weight, or an attached supplemental weight, venturi shroud 33 could reset its position, i.e., sink as the buoy's height lessens following the passage of a wave, by allowing shroud 33 to collapse like an umbrella in its closed configuration. In this embodiment, Shroud 33 can then re-inflate passively as buoy 26 rises and water flows back into shroud 33, like an umbrella being opened.

The preferred embodiment of the full-sized venturi-pinwheel wave-energy device transmits its rotary energy to the surface through mechanical shaft or cable 57 that is attached to the central shaft of the turbine. The mechanical rotational energy is converted into electrical energy with a generator mounted above the water line. To adapt this technology to small, portable devices, a small water-proof generator is located near the turbine and shares a common axle 24*a* with it.

The resulting power is transmitted to buoy 26 through primary electrical cable 44 which may also support the venturi shroud assembly as it hangs beneath buoy 26. The preferred embodiment of a portable version of the venturi-pinwheel device includes central rigid support 57 securing cable assembly 44 to the turbine assembly. Central rigid support 57 maintains the vertical alignment of venturi shroud 33 and turbine 20*b* as the venturi shroud is pulled toward the surface by buoy 26. The upward force provided by the buoy acts on the upper end of rigid support 57, and the drag induced by the unfurled venturi shroud 33 acts on the lower end of support 57. For the same reason that a wind vane orients itself to point into the wind, the central rigid support, and its attached venturi shroud, are compelled to point toward the buoy. Without this central rigid support, the orientation of the venturi shroud would be unstable, i.e., under the influence of water moving past it as it rises, the shroud would tend to turn sideways and a collapsible shroud would tend to partially collapse.

Because of its small size, solid turbine blade 20*b* (FIGS. 13 and 14) is advantageous, instead of an articulating bi-directional turbine. Venturi shroud 33 funnels water into the turbine, increasing the water's speed, while the buoy and turbine are rising. The preferred embodiment of the full-sized venturi-pinwheel wave-energy device has a bi-directional venturi shroud allowing it to generate power when falling as well as rising. These adaptations allow the portable embodiment of the turbine to extract a significant amount of power from the seawater only while the buoy and turbine are rising.

It is also possible to construct a "miniaturized" version of the preferred embodiment of this device, i.e., a bi-directional venturi tube incorporating a bi-directional turbine. Such a device could utilize a local water-proof generator or a shaft transmitting rotational energy to a buoy at the surface of the water. For some applications this intermediate design may be advantageous. The scope of this patent includes all variations in the sizes of the devices disclosed.

The preferred embodiment of a portable version of the venturi-pinwheel device, which incorporates a collapsible venturi shroud, also contains rigid collar 60 serving as the base for the collapsible venturi shroud 33 to constrain its alignment. Propeller/turbine 20*b* is positioned concentrically with rigid collar 60 because the lumen of rigid collar 60 is the narrowest part of the lumen created by shroud 33. Rigid frame members 56 have a first end pivotally secured to rigid collar 60 in circumferentially spaced relation to one another.

FIG. 14 illustrates the configuration of the portable embodiment depicted in FIG. 13 when it is incorporates a collapsible venturi shroud and is stored within canister 55. Rigid frame members 56 of venturi shroud 33 pivot toward rigid central support 57 of the device, and venturi shroud fabric 58 collapses like a retracted umbrella. Such a stored device may slide out of storage canister 55 following the removal of optional canister lid 62.

FIG. 15 depicts the portable embodiment of FIGS. 13 and 14 with small buoy 26*a*. This embodiment has utility in connection with a life raft. When the assembly of FIGS. 13 and 14 is connected to buoy 26*a* by cable 44, the rising and falling of the portable venturi shroud generates electrical power. A life raft itself could serve as the buoy. A relatively small, portable embodiment of the inventive device could generate about one hundred (100) watts continuously. This portable embodiment has utility in providing electrical power to distress beacons, locator devices, water distillation equipment, and the like.

Figure 16A:
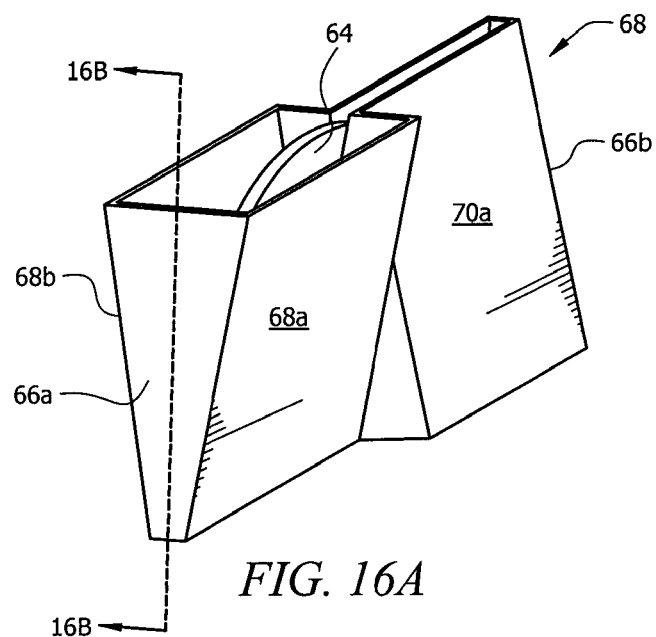
FIG. 16A is a perspective view of another embodiment of the novel venturi turbine.
Figure 16B:
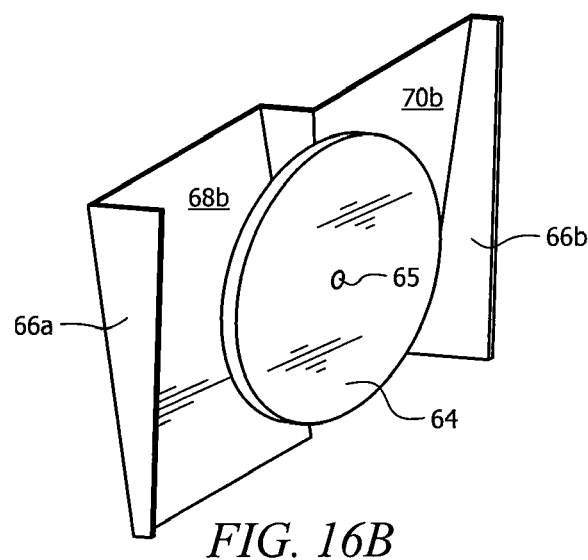
FIG. 16B is a sectional view taken along line 16B-16B in FIG. 16A.

FIGS. 16A and 16B depict one of many possible embodiments of the novel venturi-pinwheel wave-energy device that are within the scope of this disclosure. FIG. 16B is a cross-sectional view of housing 68 taken along line 16B-16B in FIG. 16A.

Water wheel 64 is mounted for rotation about axle 65 in housing 68 that includes two substantially parallel vertical walls 66*a*, 66*b*. Housing 68 has two compartments that are in fluid communication with one another. The first compartment is defined by sidewall 66*a*, front wall 68*a*, and back wall 68*b*. Front and back walls 68*a*, 68*b* converge toward one another from top to bottom, creating a venturi effect at the bottom of said first compartment. The second compartment is defined by side wall 66*b*, front wall 70*a* and back wall 70*b*. Front and back walls 70*a*, 70*b* diverge from one another from top to bottom, creating a venturi effect at the top of said compartment.

Axle 65 of water wheel 64 is positioned in the center of housing 68 so that half of said water wheel is in the first compartment and half is in the second compartment.

Figure 17B:
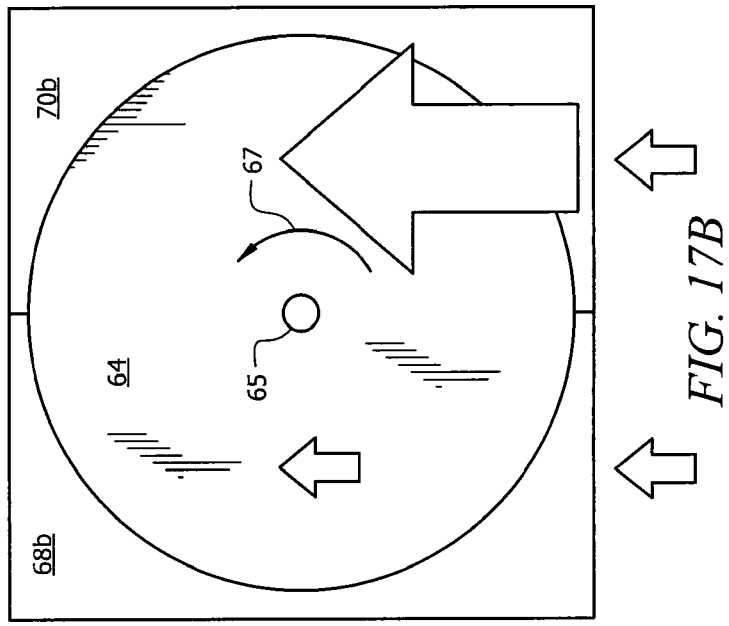
FIG. 17B is a side elevational diagrammatic depiction of water flowing in a second direction relative to the water wheel of FIGS. 16A and 16B.
Figure 17A:
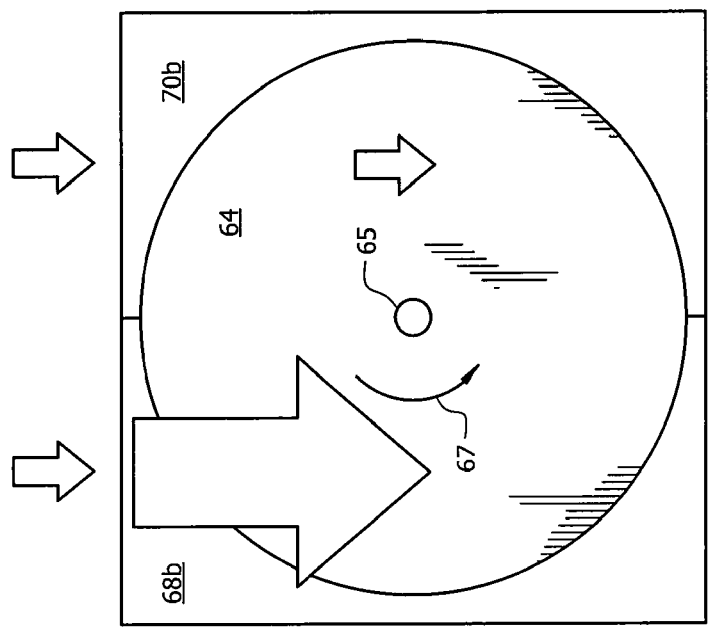
FIG. 17A is a side elevational diagrammatic depiction of water flowing in a first direction relative to the water wheel of FIGS. 16A and 16B.

As illustrated in FIG. 17A, the left compartment receives water entering from the top and accelerates it as it moves toward the bottom, due to the decreasing cross-sectional area of said compartment, as indicated by the large straight arrow. Conversely, any water entering the right compartment from the top decelerates as it flows through said compartment's increasing top-to-bottom cross-sectional area, as indicated by the small straight arrow to the right of said large straight arrow.

This imbalance in water speed as water enters from the top, in the left and right compartments of housing 68, causes an unequal impetus to water wheel 64, causing it to spin about its axis 65 in the direction indicated by directional arrow 67 in FIG. 17A so as to best accommodate the flow of water in the left compartment of said housing 68.

The opposite effect is observed when water enters housing 68 from the bottom as depicted in FIG. 17b. The water in the right compartment of housing 68 is accelerated as indicated by the large straight arrow and the water in the left compartment is decelerated as indicated by the small straight arrow. This imbalance in the speed of the water traversing the left and right halves of the device results in a rotation of water wheel 65 in the same direction as when the water enters from the top.

Figure 18:
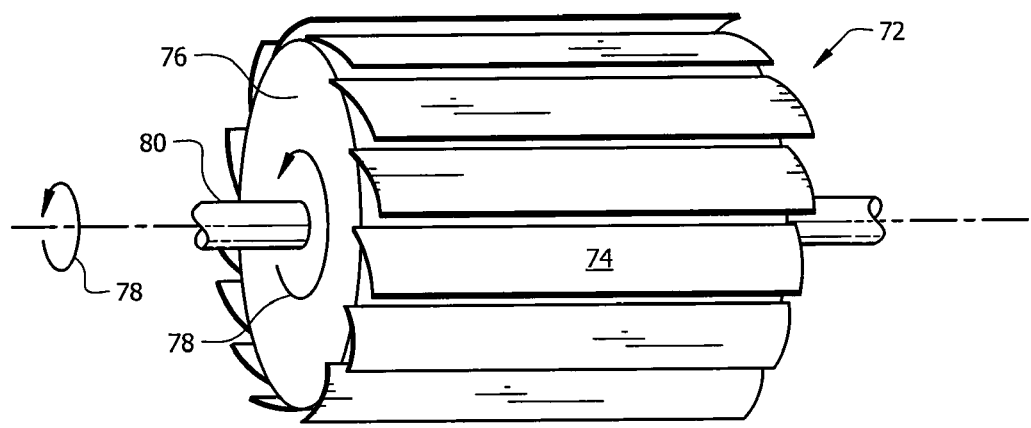
FIG. 18 depicts another turbine design suitable for use in a venturi wave energy device.

FIG. 18 depicts another type of water turbine, denoted 72 as a whole, having utility with this invention, especially with respect to the embodiment illustrated in FIGs. 10, 11 and 12. This type of water wheel rotates in the same direction regardless of the direction of water flow, i.e., within a plane normal to the axis of the water wheel's rotation, which accounts for any up and down water flow. More particularly, blades 74 on the front of drum 76 as drawn capture upward flowing water and cause rotation of drum 76 about axle 80 in the rotational direction indicated by directional arrow 78. Blades 74 on the back of the drum as drawn capture downward-flowing water and rotate drum 76 in the same direction 78. It should be understood that drum 76 is positioned in the constricted throat of a venturi tube as taught by this invention.

Figure 20:
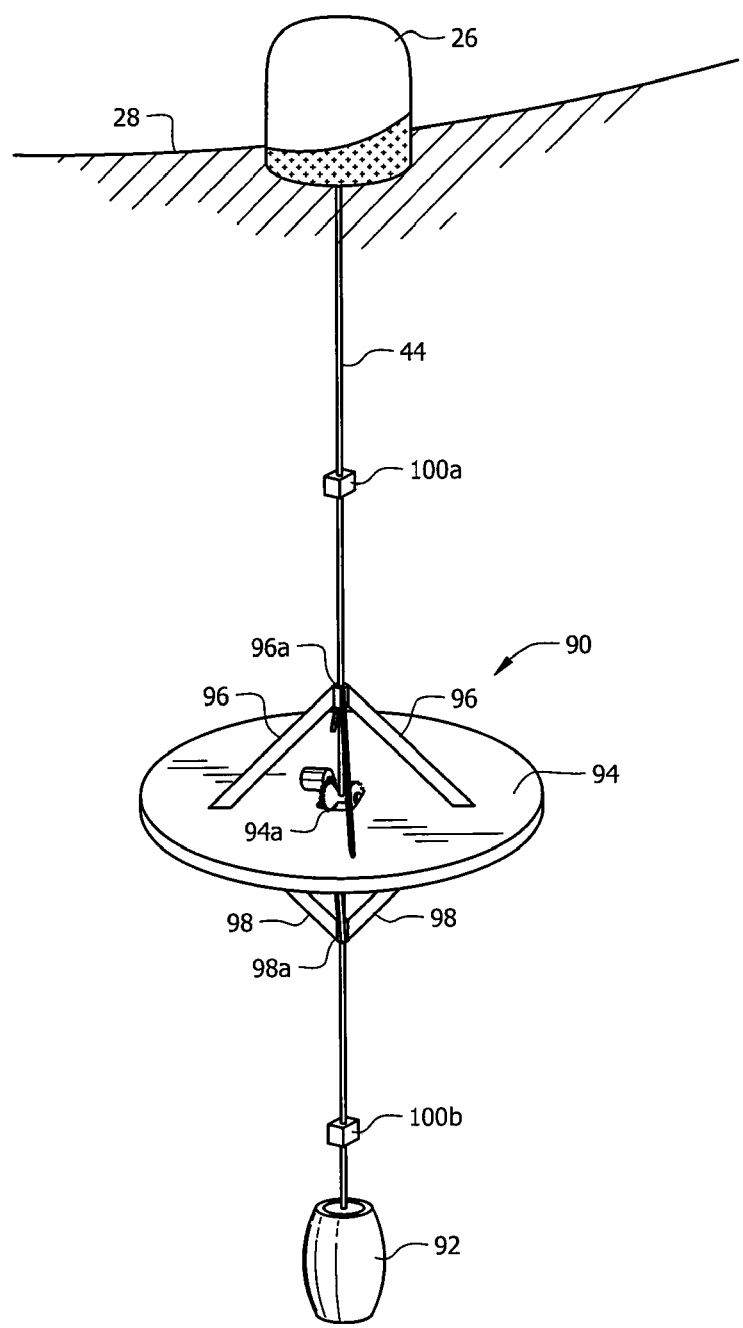
FIG. 20 is a perspective view of a sea-anchor wave energy conversion device.

FIG. 20 depicts an alternative embodiment of the invention, denoted 90 as a whole, that uses a sea-anchor instead of a venturi tube. FIG. 20 illustrates the principle by which the sea-anchor embodiment translates the circular up-and-down motion characteristic of deep-water waves traveling across the surface of a body of water into a corresponding up-and-down motion of a cable whose movements cause an attached capstan to rotate, which in turns causes the rotation of an underwater turbine located far below the surface. The capstan rotates when its attached cable rises or falls since the platform to which it is attached is unable to match the cable's movements due to induced drag.

Buoyant flotation module or buoy 26 follows a circular up-and-down orbit 14 at the surface of a body of water 28 in response to the passage of deep-water waves across the surface of said body of water. The buoy constrains counterweight 92 and cable 44 suspended beneath it to duplicate its vertical movements.

More particularly, buoy 26 and counter-weight 92 are directly connected to one another by cable 44.

Figure 21:
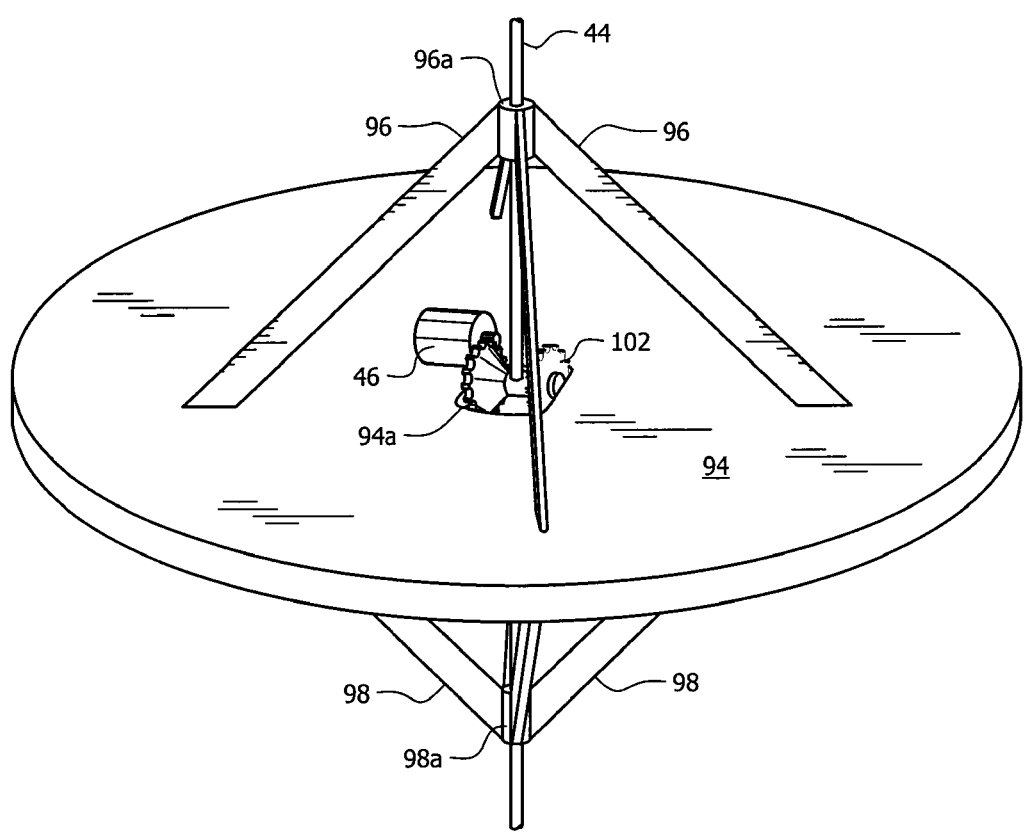
FIG. 21 is an enlarged view of the sea-anchor disk and attached capstan of the sea-anchor wave energy device illustrated in FIG. 20.

As illustrated in FIG. 21, flat platform 94 is centrally apertured as at 94a and is indirectly attached to cable 44. The movements of platform 94 are constrained in such a way so as to limit those movements to vertical risings and failings wherein the central axis of the platform, normal to its surface, remains coaxial with the central axis of the cable. One method which may be used to achieve this is through the use of brace members, said brace members including a first pair of braces 96 positioned on a top side of platform 94 and a second pair of braces 98 positioned on a bottom side of said platform. Upper brace members 96 have a first end secured to sleeve 96a and a second end secured to a top wall of said platform. Lower brace members 98 have a first end secured to sleeve 98a and a second end secured to a bottom wall of said platform.

Cable 44 extends through the respective lumens of sleeves 96a, 98a, and also through central aperture 94a of platform 94. In this way, platform 94 is free to travel up and down the length of cable 44. Due to the tension maintained in cable 44 by the buoyancy of buoy 26, and the weight of counter-weight 92, platform 94 cannot deviate far from a coaxial orientation with the common longitudinal axis of buoy 26 and counter-weight 92.

The vertical movements of platform 94 are further limited by a pair of stops 100a, 100b secured to cable 44 above and below said platform, respectively. The diameter of each stop exceeds the diameter of the respective lumens of sleeves 96a, 98a.

Platform 94 is substantially neutrally buoyant. Therefore, its inertial mass is approximately equal to the mass of the sea water that it displaces, and should be substantial. The mass of the platform will thus exhibit significant acceleration only when acted upon by a substantial force.

FIG. 21 is an enlarged view of platform 94. Cable 44 does not simply pass through central aperture 94a as implied above; instead it is wound around capstan 102 that is mounted in said central aperture for rotation about its horizontal axis. Capstan 102 is constrained to rotate as cable 44 moves relative to platform 94, i.e., cable 44 cannot move vertically relative to 94 platform without rotating capstan 102. Generator 46 is coupled to capstan 102 so that rotation of the capstan results in the generation of electrical energy. Alternately, rotation of the capstan is used to turn a cable that connects the capstan directly or indirectly to a generator or alternator in buoy 26.

This device extracts energy from ocean waves because platform 94 is held at a depth near or greater than wave base 18. Upward and downward movements of cable 44, induced by the rising of buoy 26 and the sinking of counter-weight 92, in response to passing waves, are not matched by equal vertical oscillations of platform 94. As cable 44 rises or falls, the force pulling on the cable is applied to the platform, which is urged to rise or fall with it. However, the platform's mass, and corresponding inertia, limits the ability of the cable's force to move it. Any resulting motion induced in the platform, in the relatively motionless waters surrounding it, is countered by the substantial drag resulting from that motion.

The combination of the platform's inertia, and the substantial drag which counters any movement of the platform through the water, effectively limits its ability to move in synchrony with the rising and falling movements of the attached cable.

Since the platform is unable to match the movements of the cable, the only remaining way the cable may fully rise or fall is for the capstan, about which it is wound, to rotate.

The platform's inertia, along with any induced drag, prevents it from changing its position appreciably. Therefore, most of the force on the cable is applied to the rotation of capstan 102 and generator 46.

If a generator is mounted to the platform for conjoint rotation with the shaft of the capstan, an electrical cable connecting the generator to the buoy can be secured to the outer edge of the platform, and from there connected directly to the buoy above. However, small floats should be secured to the electrical cable to prevent it from sagging so that it does not become entangled with the capstan.

The platform is substantially neutrally buoyant. Its operational depth at or near the wave base is achieved and maintained as a result of the platform's interactions with the stops attached to cable 44. If the platform is above its intended minimum depth, then the weight of counterweight 92 is not offset by the upward pull of buoy 26. Thus counterweight 92 and cable 44 descend until upper stop 100a abuts upper sleeve 96a. At this point, the counterweight's pull continues unabated until the platform has reached a sufficient depth.

If the platform descends below a preselected maximum depth, buoy 26 will be submerged some or all of the time. While submerged, the upward pull of the buoy, less the counteracting downward pull of counterweight 92, is applied to platform 94 when lower stop 100b abuts lower sleeve 98a. The platform will rise until this condition is remedied.

Preferably, the maximum buoyancy of buoy 26 exceeds twice the combined weight of the venturi device and counterweight 92. However, empirical studies may demonstrate that a different buoyancy is preferable.

Platform 94 is driven to move up-and-down with cable 44 but it is unable to do so to a significant degree due to the platform's inertia, and the drag that counters any movement. The platform's drag increases in proportion to the square of the vertical speed of the platform. Platform movement stops when the magnitude of its drag matches the cable's vertical force. The upward or downward speed of the platform never reaches zero as long as there is a net upward or downward force on the cable. However, the terminal velocity of the platform is very low; the cable's velocity will therefore exceed that of the platform during most of the wave cycle.

Figure 19:
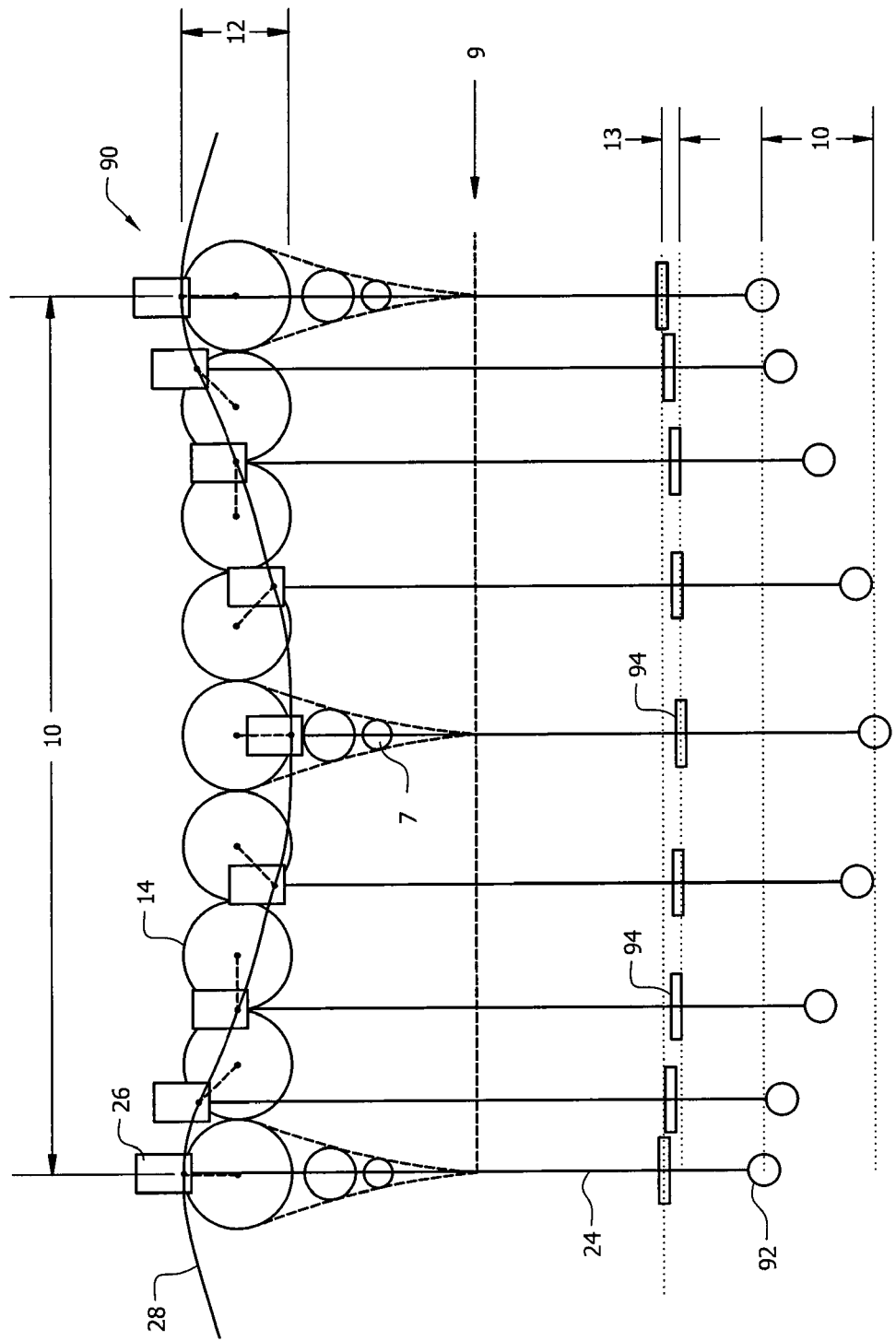
FIG. 19 depicts the movement of a sea-anchor wave energy device in response to a passing wave. Note the minimal vertical motion of the underwater platform, and the relatively great vertical motion of the cable (connecting the float to the counterweight) through the platform (thus rotating the capstan attached to the platform).

The net amplitude of the cable's movement, relative to the platform, is equal to the amplitude 12 of the waves less the amplitude 13 of the platform's oscillations, as indicated in FIG. 19.

When cable 44 is moving relative to platform 94, all of the cable's force is directed at the rotation of capstan 102 about which it is wound, and which is firmly attached to the platform. Thus, during most of the wave cycle, most of the cable's vertical force is translated into an equivalent torque within the capstan, compelling the capstan to rotate about its axis, thus driving rotation of generator 46.

The platform's drag is increased, thus increasing the efficiency of wave-energy conversion, if it is equipped with a cylindrical wall, top and bottom.

Figure 22:
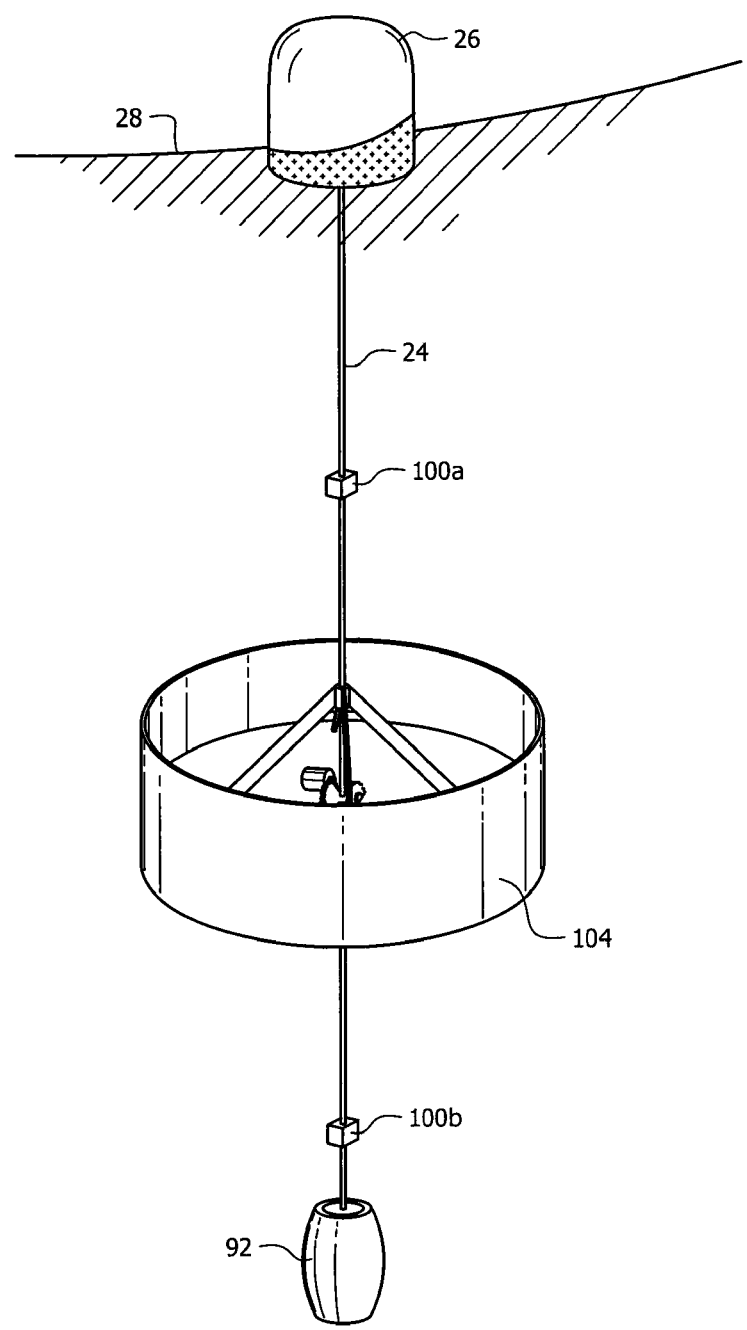
FIG. 22 is a perspective view of the preferred embodiment of the sea-anchor wave energy conversion device.

FIG. 22 illustrates the preferred embodiment of the novel sea-anchor. Cylindrical wall 104 is mounted about the periphery of platform 94, i.e., in ensleeving relation to said platform, so that said platform is positioned mid-length of the lumen of said cylindrical wall, i.e., so that the extent of cylindrical wall 104 that extends above the plane of said platform is substantially equal to the extent of said cylindrical wall that extends below the plane of said platform. Cylindrical wall 104 substantially increases the coefficient of drag of platform 94, thus reducing the extent of its movement in response to the movements of buoy 26 and counterweight 92.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A wave energy conversion apparatus, comprising:
a flotation device adapted to float on the surface of a body of water having a wave base;
a venturi device having a venturi channel including an upper mouth, a lower mouth and a constricted region between the upper and lower mouths;
a connection assembly connecting the venturi device to the flotation device such that when the apparatus is in position in the body of water, the venturi device is positioned below the flotation device and at a distance below the surface of the body of water near or below the wave base, and water flows downwardly in the venturi channel and through the constricted region when the flotation device moves upwardly by wave action in the body of water and water flows upwardly in the venturi channel and through the constricted region when the flotation device moves downwardly by wave action in the body of water; and
a turbine in the venturi channel;
the constricted region has a cross-sectional area that is less than one-half of that of one of the upper or lower mouths thereby causing water flowing through the constricted region to have a speed that is more than two times the speed of water entering the one of the upper or lower mouths;
a plurality of rods, each of the rods extending between the flotation device and the venturi tube; and
at least one of a first extension cuff extending upwardly from the upper mouth and a second extension cuff extending downwardly from the lower mouth.

2. The apparatus of claim 1 wherein at least one of the rods is connected to the venturi tube at a location outside of the venturi channel.

3. The apparatus of claim 1 wherein the rods extend down and along the outer surface of the venturi tube and are secured thereto.

4. The apparatus of claim 1 wherein the rods are positioned at least partially within an envelope defined by an outside surface of the venturi tube.

5. The apparatus of claim 1 wherein the rods are connected to the venturi tube at a plurality of locations including at least one location outside of an innermost surface of the constricted region.

6. The apparatus of claim 1 wherein the venturi tube is connection to the flotation device at a plurality of connection points on the flotation device and at least one of the connection points is at least partially outside of an upward projection of the innermost surface of the constricted region of the venturi tube.

7. The apparatus of claim 1 wherein the cross-sectional area of the constricted region is less than one-quarter, one-sixteenth or one-sixty-fourth of that of one of the upper or lower mouths thereby causing water flowing through the constricted region to have a speed that is more than respectively four, sixteen or sixty-four times the speed of water entering the one of the upper or lower mouths.

8. The apparatus of claim 1 wherein the plurality of rods are configured to connect the venturi tube to the flotation device such that when the apparatus is in position in the body of water a top of the venturi tube, if there is no first extension cuff, or if there is a first extension cuff, the top of the first extension cuff is at or below the wave base.

9. The apparatus of claim 1 wherein the venturi tube is centered underneath the flotation device.

10. A wave energy conversion apparatus, comprising:
a flotation device adapted to float on the surface of a body of water having a wave base;
a venturi tube having a venturi channel including an upper mouth, a lower mouth and a constricted region between the upper and lower mouths;

the venturi tube is connected to the flotation device such that when the apparatus is in position in the body of water, the venturi tube is positioned below the flotation device and at a distance below the surface of the body of water near or below the wave base, and water flows downwardly in the venturi channel and through the constricted region when the flotation device moves upwardly by wave action in the body of water and water flows upwardly in the venturi channel and through the constricted region when the flotation device moves downwardly by wave action in the body of water;

a turbine in the venturi channel;

the constricted region has a cross-sectional area that is less than one-half of that of one of the upper or lower mouths thereby causing water flowing through the constricted region to have a speed that is more than two times the speed of water entering the one of the upper or lower mouths;

the venturi tube is connected to the flotation device at a plurality of connection points on the flotation device and at least one of the connection points is at least partially outside of an upward projection of the innermost surface of the constricted region of the venturi tube; and at least one of a first extension cuff extending upwardly from the upper mouth and a second extension cuff extending downwardly from the lower mouth.

11. The apparatus of claim 10 wherein the flotation device is connected to the venturi tube at one or more locations outside of an innermost surface of the constricted region of the venturi channel.

12. The apparatus of claim 10 wherein a plurality of elongate members connect the venturi tube to the flotation device and extend down the venturi tube and are secured thereto.

13. The apparatus of claim 10 wherein the flotation device is connected to the venturi tube at a plurality of locations including at least one location at least partially outside of an innermost surface of the constricted region.

14. The apparatus of claim 10 wherein the cross-sectional area of the constricted region is less than one-quarter, one-sixteenth or one-sixty-fourth of that of one of the upper or lower mouths thereby causing water flowing through the constricted region to have a speed that is more than respectively four, sixteen or sixty-four times the speed of water entering the one of the upper or lower mouths.

15. The apparatus of claim 10 wherein the venturi tube is connected to the flotation device such that when the apparatus is in position in the body of water a top of the venturi tube, if there is no first extension cuff, or if there is a first extension cuff, the top of the first extension cuff is at or below the wave base.

16. The apparatus of claim 10 wherein the venturi tube is centered underneath the flotation device.

17. A wave energy conversion apparatus, comprising:

a flotation device that is adapted to float on the surface of a body of water having a wave base;

a venturi tube having a venturi channel including an upper mouth, a lower mouth and a constricted region between the upper and lower mouths;

the venturi tube being connected to the flotation device such that when the apparatus is in position in the body of water, the venturi tube is positioned below the flotation device and at a distance below the surface of the body of water near or below the wave base, and water flows downwardly in the venturi channel and through the constricted region when the flotation device moves upwardly by wave action in the body of water and water flows upwardly in the venturi channel and through the constricted region when the flotation device moves downwardly by wave action in the body of water;

a turbine in the venturi channel; and at least one of a first extension cuff extending upwardly from the upper mouth and a second extension cuff extending downwardly from the lower mouth.

18. The apparatus of claim 17 further comprising both the first extension cuff and the second extension cuff and a casing having an upper end which the first extension cuff abuts and a lower end which the second extension cuff abuts.

19. The apparatus of claim 17 further comprising both the first extension cuff and the second extension cuff, and a tubing which forms the first extension cuff, the second extension cuff and a housing for the venturi channel.

20. The apparatus of claim 17 further comprising a plurality of vertical rods connecting the venturi tube to the flotation device and wherein the vertical rods extend down and are attached to the first extension cuff and/or to a casing for the venturi channel.

21. The apparatus of claim 17 further comprising a generator supported by the flotation device or the venturi device and to which the turbine is operatively connected.

22. The apparatus of claim 17 wherein the venturi tube is held rigidly relative to the flotation device to thereby maintain a fixed distance therebetween.

23. The apparatus of claim 17 wherein at least one cable connects the venturi tube to the flotation device and/or the first extension cuff.

24. The apparatus of claim 23 wherein the at least one cable is non-stretchable.

25. The apparatus of claim 17 wherein the venturi tube is connected to the flotation device such that when the apparatus is in position in the body of water a top of the venturi tube, if there is no first extension cuff, or if there is a first extension cuff, the top of the first extension cuff is at or below the wave base.

26. The apparatus of claim 17 wherein a flexible assembly connects the venturi tube to the flotation device to allow the longitudinal axis of the venturi tube to not be coaxial with the longitudinal axis of the flotation device.

27. The apparatus of claim 26 wherein the flexible assembly includes at least one cable.

28. The apparatus of claim 17 wherein the at least one extension is configured to direct the force resulting from the acceleration of the water within the at least one extension so as to either increase the pressure of the water entering a constricted portion of the venturi channel or to decrease the pressure of the water exiting a constricted portion of the venturi channel.

29. The apparatus of claim 17 wherein the longitudinal axis of the at least one extension is coaxial with the longitudinal axis of the venturi channel.

30. The apparatus of claim 17 wherein the distance between the venturi tube and the surface of the body of water is sufficient to place the tube in water that is at or below the wave base so that upward movements of the tube cause the tube to impinge upon still water above the top opening of the first extension.

31. The apparatus of claim 17 wherein the apparatus includes the first extension, and the first extension includes a top mouth whose perimeter lies in a plane normal to a longitudinal axis of the first extension.

32. The apparatus of claim 17 wherein the at least one extension comprises a tube.

33. The apparatus of claim 17 wherein the venturi tube is centered underneath the flotation device.

34. A wave energy conversion apparatus, comprising:
a flotation device adapted to float on the surface of a body of water having a wave base;
a venturi tube having a venturi channel including an upper mouth, a lower mouth and a constricted region between the upper and lower mouths;
the venturi tube is connected to the flotation device such that when the apparatus is in position in the body of water, the venturi tube is positioned below the flotation device and at a distance below the surface of the body of water near or below the wave base, and water flows downwardly in the venturi channel and through the constricted region when the flotation device moves upwardly by wave action in the body of water and water flows upwardly in the venturi channel and through the constricted region when the flotation device moves downwardly by wave action in the body of water;
a turbine in the venturi channel;
the constricted region has a cross-sectional area that is less than one-half of that of one of the upper or lower mouths thereby causing water flowing through the constricted region to have a speed that is more than two times the speed of water entering the one of the upper or lower mouths; and
at least one of a first extension cuff extending upwardly from the upper mouth and a second extension cuff extending downwardly from the lower mouth.

35. The apparatus of claim 34 wherein the cross-sectional area of the constricted region is less than one-quarter of that of one of the upper or lower mouths thereby causing water flowing through the constricted region to have a speed that is more than four times the speed of water entering the one of the upper or lower mouths.

36. The apparatus of claim 34 wherein the cross-sectional area of the constricted region is less than one-sixteenth of that of one of the upper or lower mouths thereby causing water flowing through the constricted region to have a speed that is more than sixteen times the speed of water entering the one of the upper or lower mouths.

37. The apparatus of claim 34 wherein the cross- sectional area of the constricted region is less than one-sixty-fourth of that of one of the upper or lower mouths thereby causing water flowing through the constricted region to have a speed that is more than sixty-four times the speed of water entering the one of the upper or lower mouths.

38. The apparatus of claim 34 wherein the turbine is in the constricted region.

39. The apparatus of claim 34 wherein the cross- sectional area is less than one-half of that of the upper mouth and that of the lower mouth thereby causing water flowing through the constricted region to have a speed that is more than two times the speed of water entering either of the upper or lower mouths.

40. The apparatus of claim 34 wherein the venturi tube is held rigidly relative to the flotation device to thereby maintain a fixed distance therebetween.

41. The apparatus of claim 34 wherein at least one cable connects the venturi tube to the flotation device and/or the first extension cuff.

42. The apparatus of claim 41 wherein at least one cable connects the venturi tube to the flotation device and/or the first extension cuff.

43. The apparatus of claim 34 further comprising a generator to which the turbine is operatively connected.

44. The apparatus of claim 43 wherein the generator is at the flotation device.

45. The apparatus of claim 43 wherein the generator is at the venturi tube.

46. The apparatus of claim 43 wherein the turbine is a perpendicular axis turbine.

47. The apparatus of claim 43 wherein a connector between the turbine and the generator includes a rigid shaft.

48. The apparatus of claim 43 wherein a connector between the turbine and the generator includes a flexible shaft.

49. The apparatus of claim 34 wherein the cross-sectional shape of the channel perpendicular to a longitudinal axis of the channel is non-circular.

50. The apparatus of claim 34 further comprising:
a first vane positioned at a first end of the venturi channel and configured to impart a swirling motion to water flowing into the first end of the channel; and a second vane positioned at a second end of the venturi channel and configured to impart a swirling motion to water flowing into the second end of the channel.

51. The apparatus of claim 34 further comprising a plurality of wings connected to the venturi tube in radial relation to a longitudinal axis of symmetry of the venturi tube, and the wings are configured to inhibit rotation of the venturi tube in the body of water.

52. The apparatus of claim 34 wherein the venturi channel has an hourglass shape.

53. The apparatus of claim 34 wherein the apparatus includes both the first extension cuff and the second extension cuff.

54. The apparatus of claim 53 wherein a casing has an upper end which the first extension cuff abuts and a lower end which the second extension cuff abuts.

55. The apparatus of claim 53 wherein a tubing forms the first extension cuff, the second extension cuff and a housing for the venturi channel.

56. The apparatus of claim 34 wherein the apparatus includes the first extension cuff.

57. The apparatus of claim 34 wherein the apparatus includes the second extension cuff.

58. The apparatus of claim 34 wherein both of the cuffs are cylindrically shaped.

59. The apparatus of claim 34 wherein the venturi tube is connected to the flotation device at a plurality of connection points on the flotation device and at least one of the connection points is at least partially outside of an upward projection of the innermost surface of the constricted region of the venturi tube.

60. The apparatus of claim 34 further comprising a plurality of rods extending between the flotation device and the venturi tube and forming a rigid connection therebetween.

61. The apparatus of claim 34 wherein the venturi tube includes an internal hourglass-shaped venturi surface, and a casing surrounding the hourglass-shaped venturi surface, and the casing defines with the first and second extension cuffs a continuous cylinder.

62. The apparatus of claim 34 wherein the venturi tube is connected to the flotation device such that when the apparatus is in position in the body of water a top of the venturi tube, if there is no first extension cuff, or if there is a first extension cuff, the top of the first extension cuff is at or below a wave base of the body of water.

63. A wave energy conversion apparatus, comprising:
a flotation device adapted to float on the surface of a body of water;
a venturi tube having a venturi channel including an upper mouth, a lower mouth and a constricted region between the upper and lower mouths;

the venturi tube is connected to the flotation device such that when the apparatus is in position in the body of water, the venturi tube is positioned below the flotation device and at a distance below the surface of the body of water, and water inside the venturi channel flows away from the upper mouth, through the constricted region, and toward the lower mouth when the flotation device moves upwardly by wave action in the body of water, and water inside the venturi channel flows away from the lower mouth, through the constricted region and toward the upper mouth when the flotation device moves downwardly by wave action in the body of water;

a turbine in the venturi channel;

a plurality of rods, each of the rods extending between the flotation device and the venturi tube; and at least one of a first extension cuff extending upwardly from the upper mouth and a second extension cuff extending downwardly from the lower mouth;

wherein the rods are positioned at least partially within an envelope defined by an outside surface of the venturi tube.

64. The apparatus of claim 63 wherein the constricted region has a cross-sectional area that is less than one-half of that of one of the upper or lower mouths thereby causing water flowing through the constricted region to have a speed that is more than two times the speed of water entering the one of the upper or lower mouths.

65. The apparatus of claim 63 wherein the cross-sectional area of the constricted region is less than one-quarter of that of one of the upper or lower mouths thereby causing water flowing through the constricted region to have a speed that is more than four times the speed of water entering the one of the upper or lower mouths.

66. A wave energy conversion apparatus, comprising:

a flotation device adapted to float on the surface of a body of water;

a venturi tube having a venturi channel including an upper mouth, a lower mouth and a constricted region between the upper and lower mouths;

the venturi tube is connected to the flotation device such that when the apparatus is in position in the body of water, the venturi tube is positioned below the flotation device and at a distance below the surface of the body of water, and water inside the venturi channel flows away from the upper mouth, through the constricted region, and toward the lower mouth when the flotation device moves upwardly by wave action in the body of water, and water inside the venturi channel flows away from the lower mouth, through the constricted region and toward the upper mouth when the flotation device moves downwardly by wave action in the body of water;

a turbine in the venturi channel;

a plurality of rods, each of the rods extending between the flotation device and the venturi tube; and at least one of a first extension cuff extending upwardly from the upper mouth and a second extension cuff extending downwardly from the lower mouth;

wherein the rods are connected to the venturi tube at a plurality of locations including at least one location outside of an innermost surface of the constricted region.

67. The apparatus of claim 66 wherein the constricted region has a cross-sectional area that is less than one-half of that of one of the upper or lower mouths thereby causing water flowing through the constricted region to have a speed that is more than two times the speed of water entering the one of the upper or lower mouths.

68. The apparatus of claim 67 wherein the cross-sectional area of the constricted region is less than one-quarter of that of one of the upper or lower mouths thereby causing water flowing through the constricted region to have a speed that is more than four times the speed of water entering the one of the upper or lower mouths.

69. A wave energy conversion apparatus, comprising:

a flotation device adapted to float on the surface of a body of water;

a venturi tube having a venturi channel including an upper mouth, a lower mouth and a constricted region between the upper and lower mouths;

the venturi tube is connected to the flotation device such that when the apparatus is in position in the body of water, the venturi tube is positioned below the flotation device and at a distance below the surface of the body of water, and water inside the venturi channel flows away from the upper mouth, through the constricted region, and toward the lower mouth when the flotation device moves upwardly by wave action in the body of water, and water inside the venturi channel flows away from the lower mouth, through the constricted region and toward the upper mouth when the flotation device moves downwardly by wave action in the body of water;

a turbine in the venturi channel;

a first extension cuff extending upwardly from the upper mouth and a second extension cuff extending downwardly from the lower mouth; and the venturi tube including an internal hourglass-shaped venturi surface, and a casing surrounding the hourglass-shaped venturi surface, and the casing defines with the first and second extension cuffs a continuous cylinder.

70. The apparatus of claim 69 wherein the constricted region has a cross-sectional area that is less than one-half of that of one of the upper or lower mouths thereby causing water flowing through the constricted region to have a speed that is more than two times the speed of water entering the one of the upper or lower mouths.

71. The apparatus of claim 70 wherein the cross-sectional area of the constricted region is less than one-quarter of that of one of the upper or lower mouths thereby causing water flowing through the constricted region to have a speed that is more than four times the speed of water entering the one of the upper or lower mouths.

* * * * *